US009615053B2

United States Patent
Polyakov et al.

(10) Patent No.: US 9,615,053 B2
(45) Date of Patent: Apr. 4, 2017

(54) SYSTEMS AND METHODS FOR CONTROLLING ROBOTIC STANDS DURING VIDEOCONFERENCE OPERATION

(71) Applicant: REVOLVE ROBOTICS, INC., San Francisco, CA (US)

(72) Inventors: Ilya Polyakov, San Francisco, CA (US); Marcus Rosenthal, San Francisco, CA (US); Timothy Huang, San Francisco, CA (US)

(73) Assignee: REVOLVE ROBOTICS, INC., San Francisco, CA (US)

( * ) Notice: Subject to any disclaimer, the term of this patent is extended or adjusted under 35 U.S.C. 154(b) by 0 days.

(21) Appl. No.: 14/593,871

(22) Filed: Jan. 9, 2015

(65) Prior Publication Data

US 2015/0201160 A1    Jul. 16, 2015

Related U.S. Application Data

(60) Provisional application No. 61/925,982, filed on Jan. 10, 2014, provisional application No. 62/015,899, filed on Jun. 23, 2014.

(51) Int. Cl.
*H04N 7/14* (2006.01)
*H04N 5/232* (2006.01)

(52) U.S. Cl.
CPC ......... *H04N 7/142* (2013.01); *H04N 5/23206* (2013.01)

(58) Field of Classification Search
CPC ...... H04N 7/142; H04N 7/15; H04N 5/23203; H04L 65/403; G06F 3/0482; G06F 3/04842

USPC ... 348/14.03, 14.08, 169, 722, 14.05, 14.09, 348/218.1, 36, 65, 148, 159, 207.99, 348/211.3, 211.8, 211.9, 239, 376;
(Continued)

(56) References Cited

U.S. PATENT DOCUMENTS 5,185,667 A * 2/1993 Zimmermann ....... G06T 3/0018
348/143
5,313,306 A * 5/1994 Kuban .............. G06F 17/30017
348/240.99
(Continued)

OTHER PUBLICATIONS

International Search Report & Written Opinion dated Apr. 9, 2015 received for PCT/US2015/010898.

*Primary Examiner* — Gerald Gauthier
(74) *Attorney, Agent, or Firm* — Dorsey & Whitney LLP

(57) ABSTRACT

Systems and methods are disclosed for selecting and orienting a computing device mounted on a robotic stand for videoconferences. For example, a method for operating a robotic stand supporting a computing device is disclosed, which includes displaying, by a display of a remote device, a control interface depicting a physical location that includes a plurality of robotic stands with respective computing devices. The method further includes providing, responsive to a user of the remote device interacting with the control interface, a selection instruction selecting a region of the physical location for viewing with one of the plurality of robotic stands with respective computing devices, and generating, by the control interface, a positioning instruction based on the selected region of the physical location, the positioning instruction configured to orient the robotic stand including the computing device determined to be available to face the region of the physical location.

21 Claims, 15 Drawing Sheets

(58) Field of Classification Search
USPC ......... 381/303; 382/118, 103, 298; 386/248; 709/205; 713/150; 248/176.3; 354/293; 378/62, 194; 600/300, 424; 219/124.22; 345/420; 700/259
See application file for complete search history.

(56) References Cited

U.S. PATENT DOCUMENTS

| | | | | |
|---|---|---|---|---|
| 5,331,413 | A * | 7/1994 | Diner | H04N 7/181 348/114 |
| 5,359,363 | A * | 10/1994 | Kuban | G06F 17/30017 348/143 |
| 5,374,971 | A * | 12/1994 | Clapp | F16M 11/10 348/14.01 |
| 5,757,424 | A * | 5/1998 | Frederick | H04N 7/15 348/14.12 |
| 6,002,430 | A * | 12/1999 | McCall | H04N 5/23238 348/143 |
| 6,148,100 | A * | 11/2000 | Anderson | G02B 27/0093 318/567 |
| 6,172,703 | B1 * | 1/2001 | Lee | H04N 7/15 348/14.08 |
| 6,380,968 | B1 * | 4/2002 | Alexander | H04N 7/15 348/14.05 |
| 6,795,106 | B1 * | 9/2004 | Cooper | H04N 7/147 348/14.07 |
| 6,930,715 | B1 * | 8/2005 | Mower | G01C 21/165 348/207.99 |
| 7,092,001 | B2 * | 8/2006 | Schulz | H04N 7/15 348/14.01 |
| 7,193,645 | B1 * | 3/2007 | Aagaard | H04N 5/222 348/157 |
| 7,342,601 | B2 * | 3/2008 | Kondo | H04L 29/06 348/14.08 |
| 7,464,262 | B2 * | 12/2008 | Ferren | H04N 7/142 348/14.08 |
| 8,098,902 | B2 * | 1/2012 | Thorne | G06K 9/00228 348/E7.078 |
| 8,374,388 | B2 * | 2/2013 | Stolkin | G06K 9/3241 382/103 |
| 8,514,262 | B2 * | 8/2013 | Ueno | G06K 9/00208 348/14.01 |
| 8,838,276 | B1 * | 9/2014 | Desai | H04N 5/23206 348/207.11 |
| 8,854,485 | B1 * | 10/2014 | Desai | H04N 5/23203 348/143 |
| 9,077,974 | B2 * | 7/2015 | You | H04N 7/142 |
| 9,131,118 | B2 * | 9/2015 | Shih | H04N 7/18 |
| 2003/0161551 | A1 * | 8/2003 | Coffland | G08B 13/19626 382/298 |
| 2003/0210329 | A1 * | 11/2003 | Aagaard | H04N 7/181 348/159 |
| 2004/0080610 | A1 | 4/2004 | James et al. | |
| 2005/0002535 | A1 | 1/2005 | Liu et al. | |
| 2006/0221072 | A1 * | 10/2006 | Se | G01C 11/06 345/420 |
| 2006/0242679 | A1 | 10/2006 | Hutchison et al. | |
| 2008/0316368 | A1 * | 12/2008 | Fritsch | H04N 5/23203 348/722 |
| 2009/0058987 | A1 | 3/2009 | Thielman et al. | |
| 2011/0032368 | A1 * | 2/2011 | Pelling | G03B 37/02 348/211.9 |
| 2011/0091055 | A1 * | 4/2011 | LeBlanc | H04S 7/301 381/303 |
| 2012/0281092 | A1 * | 11/2012 | Olivier | H04L 65/4092 348/148 |
| 2012/0315016 | A1 * | 12/2012 | Fung | H04N 5/2252 386/248 |
| 2013/0100231 | A1 | 4/2013 | Wang et al. | |
| 2013/0201345 | A1 * | 8/2013 | Ling | H04N 7/144 348/169 |
| 2014/0014637 | A1 * | 1/2014 | Hunt | B25J 9/1689 219/124.22 |
| 2014/0143345 | A1 * | 5/2014 | Jiang | H04L 12/1831 709/205 |
| 2015/0201160 | A1 * | 7/2015 | Polyakov | H04N 7/142 348/14.03 |
| 2015/0260333 | A1 * | 9/2015 | Polyakov | F16M 11/041 248/176.3 |

* cited by examiner

SYSTEMS AND METHODS FOR CONTROLLING ROBOTIC STANDS DURING VIDEOCONFERENCE OPERATION

CROSS-REFERENCE TO RELATED APPLICATIONS

This application claims the benefit of U.S. provisional patent application No. 61/925,982, filed Jan. 10, 2014, and U.S. provisional patent application No. 62/015,899, filed Jun. 23, 2014, the entire disclosures of which are hereby incorporated by reference herein in their entirety and for any purpose.

TECHNICAL FIELD

The present disclosure relates generally to videoconferencing. More particularly, various examples of the present disclosure relate to a robotic stand and systems and methods for controlling the stand during a videoconference.

BACKGROUND

Videoconferencing allows two or more locations to communicate simultaneously or substantially simultaneously via audio and video transmissions. Videoconferencing may connect individuals (such as point-to-point calls between two units, also known as videophone calls) or groups (such as conference calls between multiple locations). In other words, videoconferencing includes calling or conferencing on a one-on-one, one-to-many, or many-to-many basis.

Each site participating in a videoconference typically has videoconferencing equipment capable of two-way audio and video transmissions. The videoconferencing equipment generally includes a data processing unit, an audio input and output, a video input and output, and a network connection for data transfer. Some or all of the components may be packaged into a single piece of equipment.

SUMMARY

Examples of the disclosure may include a method for operating a robotic stand supporting a computing device during a videoconference established between the local computing device and one or more remote computing devices. The method may include displaying, by a display of a remote device, a control interface depicting a conference room that includes a schematic of a conference room table and a plurality of attendee positions, providing, responsive to a user of the remote device interacting with the control interface, a positioning instruction to orient the robotic stand about at least a pan axis or a tilt axis so that a display and a camera of the computing device faces at least one attendee position, wherein the robotic stand supporting the computing device is physically located in the conference room depicted by the control interface, and transmitting, by the remote device, over a communication network, a signal indicative of the positioning instruction to the robotic stand.

Examples of the disclosure may include automatically tracking an object during a videoconference with a computing device supported on a robotic stand. The method may include receiving an image with a camera, transmitting an electrical signal containing the pixel information of the image to at least one processing unit, determining, by the at least one processing unit, a location of a source of the pixel information of the image, and rotating the robotic stand about at least one of a pan axis or a tilt axis without further user interaction to aim the computing device at the location of the source of the pixel information of the image.

Examples of the disclosure may include a method for operation of a robotic stand supporting a computing device during a videoconference. The method may include displaying a control interface depicting a physical location that includes a plurality of robotic stands with respective computing devices, providing a selection instruction selecting a region of the physical location for viewing with one of the plurality of robotic stands with respective computing devices, wherein each of the plurality of computing devices at least includes a display and a camera, and connecting to at least one of the plurality of robotic stands including a respective computing device, wherein the at least one of the plurality of robotic stands including a respective computing device is selected based at least on proximity to the region of the physical location.

Examples of the disclosure may include a method for operation of a robotic stand supporting a computing device during a videoconference. The method may include displaying, on a display of a remote device, a control interface showing a plurality of views available from the robotic stand supporting the computing device, providing, responsive to a user of the remote device interacting with the control interface, a selection command selecting one of the plurality of views, and transmitting, by the remote device over a communications network, a signal indicative of the selection command to the robotic stand supporting the computing device.

BRIEF DESCRIPTION OF THE DRAWINGS

The accompanying drawings, which are incorporated in and constitute a part of the specification, illustrate examples of the disclosure and, together with the general description given above and the detailed description given below, serve to explain the principles of these examples.

It should be understood that the drawings are not necessarily to scale. In certain instances, details that are not necessary for an understanding of the disclosure or that render other details difficult to perceive may have been omitted. In the appended drawings, similar components and/or features may have the same reference label. It should be understood that the claimed subject matter is not necessarily limited to the particular examples or arrangements illustrated herein.

DETAILED DESCRIPTION

The present disclosure describes examples of robotic stands for use in conducting a videoconference. The robotic stand, a local computing device, and a remote computing device may be in communication with one another during the videoconference. The local computing device may be mounted onto the robotic stand and may be electrically coupled to the stand (e.g. in electronic communication with the stand). A remote participant in the videoconference, or other entity, may control the orientation of the local computing device by interacting with the remote computing device and generating motion commands for the robotic stand. For example, the remote participant may generate pan and/or tilt commands using the remote computing device and transmit the commands to the local computing device, the robotic stand, or both. The robotic stand may receive the commands and rotate the local computing device about a pan axis, a tilt axis, or both in accordance with the commands received from the remote participant. As such, a user of a remote computing device may control the orientation of a local computing device in real-time during a live videoconference. Additionally, the robotic stand may be commanded by the user to autonomously perform certain tasks, such as follow a speaker if the speaker is moving around while talking, move between two set positions based on a direction of a speaker, establish preset locations as the robotic stand scans a room, etc. Moreover, one or more robotic stands and local computing devices may be located in various locations in and around an office complex that may be operated by one or more remote users to interact with individuals in and around the office complex.

Figure 1:
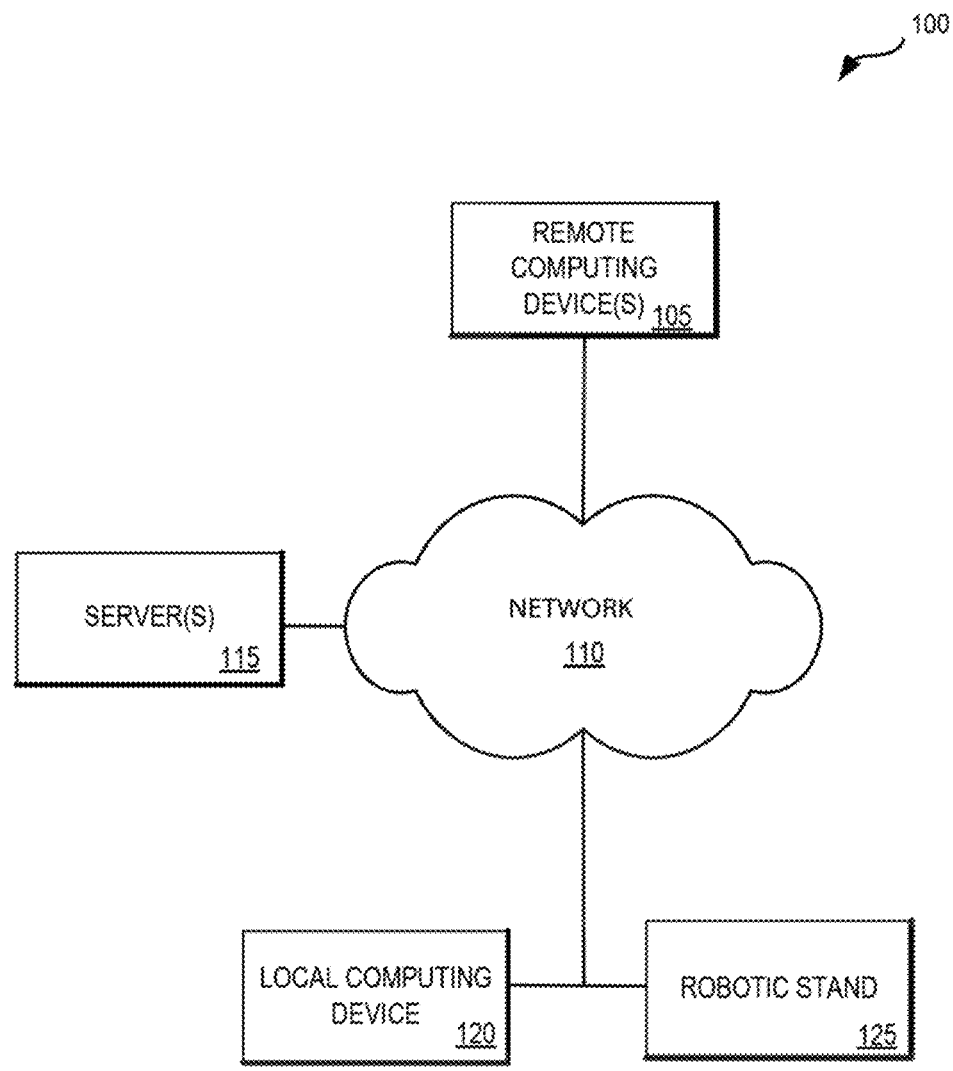
FIG. 1 is a schematic diagram of a videoconference network system in accordance with an embodiment of the disclosure.

FIG. 1 is a schematic diagram of a videoconference system 100 in accordance with an embodiment of the disclosure. The videoconference system 100 may include one or more remote computing devices 105, a communications network 110, one or more servers 115, a local computing device 120, and a robotic stand 125. Although not depicted, the videoconference system 100 may include network equipment (such as modems, routers, and switches) to facilitate communication through the network 110.

The one or more remote computing devices 105 may include, but are not limited to, a desktop computer, a laptop computer, a tablet, a smart phone, or any other computing device capable of transmitting and receiving videoconference data. Each of the remote computing devices 105 may be configured to communicate over the network 110 with any number of devices, including the one or more servers 115, the local computing device 120, and the robotic stand 125. The network 110 may comprise one or more networks, such as campus area networks (CANs), local area networks (LANs), metropolitan area networks (MANs), personal area networks (PANs), wide area networks (WANs), cellular networks, and/or the Internet. Communications provided to, from, and within the network 110 may be wired and/or wireless, and further may be provided by any networking devices known in the art, now or in the future. Devices communicating over the network 110 may communicate by way of various communication protocols, including TCP/IP, UDP, RS-232, and IEEE 802.11.

The one or more servers 115 may include any type of processing resources dedicated to performing certain functions discussed herein. For example, the one or more servers 115 may include an application or destination server configured to provide the remote and/or local computing devices 105, 120 with access to one or more applications stored on the server. In some embodiments, for example, an application server may be configured to stream, transmit, or otherwise provide application data to the remote and/or local computing devices 105, 120 such that the devices 105, 120 and an application server may establish a session, for example a video client session, in which a user may utilize on the remote or local computing devices 105, 120 a particular application hosted on the application server. As another example, the one or more servers 115 may include an Internet Content Adaptation Protocol (ICAP) server, which may reduce consumption of resources of another server, such as an application server, by separately performing operations such as content filtering, compression, and virus and malware scanning. In particular, the ICAP server may perform operations on content exchanged between the remote and/or local computing devices 105, 120 and an application server. As a further example, the one or more servers 115 may include a web server having hardware and software that delivers web pages and related content to clients (e.g., the remote and local computing devices 105, 120) via any type of markup language (e.g., HyperText Markup Language (HTML) or eXtensible Markup Language (XML)) or other suitable language or protocol.

The local computing device 120 may include a laptop computer, a tablet, a smart phone, or any other mobile or portable computing device that is capable of transmitting and receiving videoconference data. The local computing device 120 may be a mobile computing device including a display or screen that is capable of displaying video data. The local computing device 120 may be mounted onto the robotic stand 125 to permit a user of one of the remote computing devices 105 to remotely orient the local computing device 120 during a videoconference. For example, a user of one of the remote computing devices 105 may remotely pan and/or tilt the local computing device 120 during a videoconference, for example by controlling the robotic stand 125. The local computing device 120 may be electrically coupled to the robotic stand 125 by a wired connection, a wireless connection, or both. For example, the local computing device 120 and the robotic stand 125 may communicate wirelessly using Bluetooth.

Figure 2A:
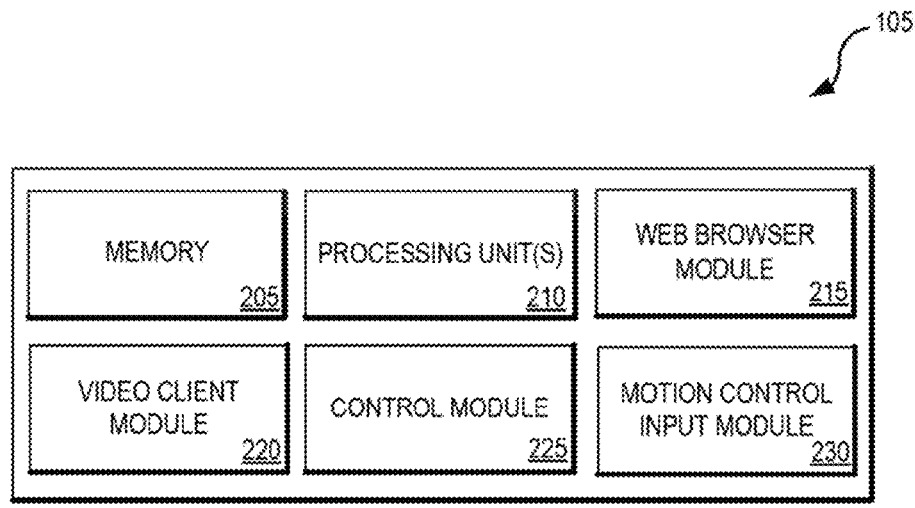
FIG. 2A is a schematic diagram of a remote computing device in accordance with an embodiment of the disclosure.
Figure 2B:
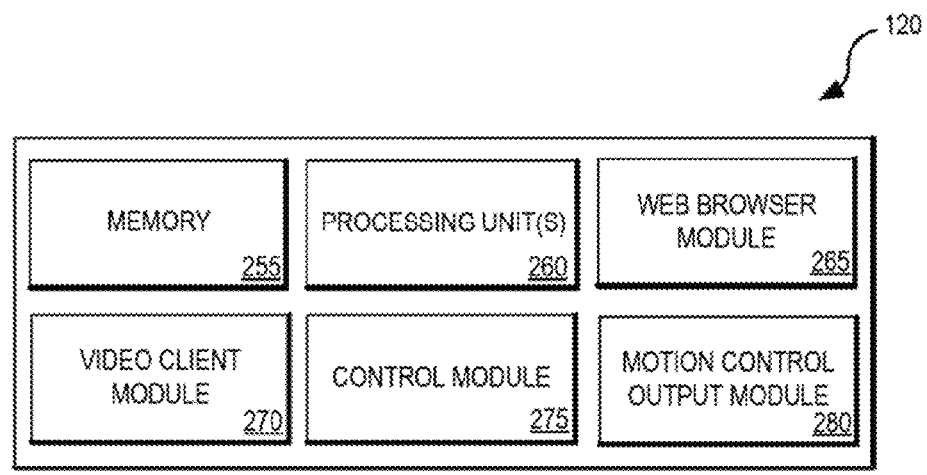
FIG. 2B is a schematic diagram of a local computing device in accordance with an embodiment of the disclosure.

FIG. 2A is a schematic diagram of an example remote computing device. FIG. 2B is a schematic diagram of an example local computing device. FIG. 6 is a schematic diagram of an example robotic stand. As shown in FIGS. 2A, 2B, and 6, the remote computing device(s) 105, the local computing device 120, and the robotic stand 125 may each include a memory 205, 255, 605 in communication with one or more processing units 210, 260, 610, respectively. The memory 205, 255, 605 may include any form of computer readable memory, transitory or non-transitory, including but not limited to externally or internally attached hard-disk drives, solid-state storage (such as NAND flash or NOR flash media), tiered storage solutions, storage area networks, network attached storage, and/or optical storage. The memory 205, 255, 605 may store executable instructions for execution by the one or more processing units 210, 260, 610, which may include one or more Integrated Circuits (ICs), a Digital Signal Processor (DSP), an Application Specific IC (ASIC), a controller, a Programmable Logic Device (PLD), a logic circuit, or the like. The one or more processing units 210, 260, 610 may include a general-purpose programmable processor controller for executing application programming or instructions stored in memory 205, 255, 605. The one or more processing units 210, 260, 610 may include multiple processor cores and/or implement multiple virtual processors. The one or more processing units 210, 260, 610 may include a plurality of physically different processors. The memory 205, 255, 605 may be encoded with executable instructions for causing the processing units 210, 260, 610, respectively to perform acts described herein. In this manner, the remote computing device, local computing device, and/or robotic stand may be programmed to perform functions described herein.

It is to be understood that the arrangement of computing components described herein is quite flexible. While a single memory or processing unit may be shown in a particular view or described with respect to a particular system, it is to be understood that multiple memories and/or processing units may be employed to perform the described functions.

With reference to FIGS. 2A and 2B, the remote computing device(s) 105 and the local computing device 120 may include a web browser module 215, 265, respectively. The web browser modules 215, 265 may include executable instructions encoded in memory 205, 255 that may operate in conjunction with one or more processing units 210, 260 to provide functionality allowing execution of a web browser on the computing devices 105, 120, respectively. The web browser module 215, 265 may be configured to execute code of a web page and/or application. The web browser module 215, 265 may comprise any web browser application known in the art, now or in the future, and may be executed in any operating environment or system. Example web browser applications include Internet Explorer®, Mozilla Firefox, Safari®, Google Chrome®, or the like that enables the computing devices 105, 120 to format one or more requests and send the requests to the one or more servers 115.

With continued reference to FIGS. 2A and 2B, the remote computing device(s) 105 and the local computing device 120 may include a video client module 220, 270, respectively. Each video client module 220, 270 may be a software application, which may be stored in the memory 205, 255 and executed by the one or more processing units 210, 260 of the computing devices 105, 120, respectively. The video client modules 220, 270 may transmit video data, audio data, or both through an established session between the one or more remote computing devices 105 and the local computing device 120, respectively. The session may be established, for example, by way of the network 110, the server(s) 115, the web browser modules 215, 265, or any combination thereof. In one implementation, the session is established between the computing devices 105, 120 via the Internet.

With further reference to FIGS. 2A and 2B, the remote computing device(s) 105 and the local computing device 120 may include a control module 225, 275, respectively. Each control module 225, 275 may be a software application, which may be stored in the memory 205, 255 and executed by the one or more processing units 210, 260 of the computing devices 105, 120, respectively. Each control module 225, 275 may transmit and/or receive motion control data through an established session between the one or more remote computing devices 105 and the local computing device 120, respectively. The motion control data may contain motion commands for the robotic stand 125.

In some implementations, the video client modules 220, 270 and the control modules 225, 275 are standalone software applications existing on the computing devices 105, 120, respectively, and running in parallel with one another. In these implementations, the video client modules 220, 270 may send video and audio data through a first session established between the video client modules 220, 270. The control modules 225, 275 may run in parallel with the video client modules 220, 270, respectively, and send motion control data through a second session established between the control modules 225, 275. The first and second sessions may be established, for example, by way of the network 110, the server(s) 115, the web browser modules 215, 265, or any combination thereof. In one implementation, the first and second sessions are established between the respective modules via the Internet.

In some implementations, the video client module 220, 270 and the control module 225, 275 are combined together into a single software application existing on the computing devices 105, 120, respectively. In these implementations, the video client modules 220, 270 and the control modules 225, 275 may send video data, audio data, and/or motion control data through a single session established between the computing devices 105, 120. The single session may be established, for example, by way of the network 110, the server(s) 115, the web browser modules 215, 265, or any combination thereof. In one implementation, the single session is established between the computing devices 105, 120 via the Internet.

With specific reference to FIG. 2A, the one or more remote computing devices 105 may include a motion control input module 230. In some implementations, the motion control input module 230 may be combined together with the video client module 220, the control module 225, or both into a single software application. In some implementations, the motion control input module 230 may be a standalone software application existing on the one or more remote computing devices 105. The motion control input module 230 may permit a user of a remote computing device 105 to control the movement of the local computing device 120. For example, the motion control input module 230 may provide various graphical user interfaces for display on a screen of the remote computing device 105. A user may interact with the graphical user interface displayed on the remote computing device 105 to generate motion control data, which may be transmitted to the local computing device 120 via a session between the computing devices 105, 120. The motion control data may contain motion commands generated from the user's input into the motion control input module 230 and may be used to remotely control the orientation of the local computing device 120.

With specific reference to FIG. 2B, the local computing device 120 may include a motion control output module 280. In some implementations, the motion control output module 280 may be combined together with the video client module 270, the control module 275, or both into a single software application. In some implementations, the motion control output module 280 may be a standalone software application existing on the local computing device 120. The motion control output module 280 may receive motion control data from the video client module 220, the control module 225, the motion control input module 230 (e.g., a user interface module), the video client module 270, the control module 275, or any combination thereof. The motion control output module 280 may decode motion commands from the motion control data. The motion control output module 280 may transmit the motion control data including motion commands to the robotic stand 125 via a wired and/or wireless connection. For example, the motion control output module 280 may transmit motion control data including motion commands to the stand 125 via a physical interface, such as a data port, between the local computing device 120 and the stand 125 or wirelessly over the network 110 with any communication protocol, including TCP/IP, UDP, RS-232, and IEEE 802.11. In one implementation, the motion control output module 280 transmits motion control data including motion commands to the stand 125 wirelessly via the Bluetooth communications protocol.

Although not depicted in FIGS. 2A and 2B, the one or more remote computing devices 105 and the local computing device 120 may include any number of input and/or output devices including but not limited to displays, touch screens, keyboards, mice, communication interfaces, and other suitable input and/or output devices.

One or more remote computing devices 105 in conjunction with one or more local computing devices 120 mounted onto respective robotic stands 125 may be used to form an interactive videoconference. The one or more local computing devices 120 mounted on their respective robotic stands 125 may be placed at various locations on or around a conference room table, an office complex, and/or office workspaces. With regards to the conference table, one, some, or all of the remaining locations around the conference room table may be occupied by an attendee or another local computing device 120 mounted on a robotic stand 125. In such a layout, the attendees around the conference room table and the users operating the local computing devices 120 mounted on the robotic stands 125 may interact with one another. The local computing devices 120 mounted on the robotic stands 125 may move around (pan and tilt) so that the users of the local computing devices 120 may see the other individuals and other local computing devices 120 situated around the table. The movement of the local computing devices 120 via the robotic stands 125 may be controlled by an associated user at a remote computing device 105 using one or more control interfaces. The control interfaces may be associated with the motion control input module 230, the control module 225, the video client module 220, or combinations thereof. The control interfaces may provide the user with the ability to manipulate the direction the local computing device 120 is facing by movement of the respective robotic stand 125. The control interface or interfaces may implement a user interface that may provide the remote user a schematic or other view of the setting in which the local computing device 120 is located. For example, if the videoconference is in a conference room, the layout of the conference room may be shown as a plan view in the interface.

With regards to an office complex and office workspaces, user interfaces may depict a schematic view of the area surrounding a local computing device 120 mounted to a robotic stand 125 located at a location within the office complex, e.g., a break room, or within a workspace, e.g., a collection of cubicles and/or work tables. A user of a remote computing device 105 may select an interface associated with an area of the office complex or an office workspace to view and/or interact with individuals around the selected local computing device 120 mounted on a respective robotic stand 125. The user of the remote computing device 105 may additionally manipulate the orientation of the selected local computing device 120 vie the respective robotic stand 125 and access information regarding individuals located around that area. For example, a user of the remote computing device may select a local computing device 120 in an entry way of an office complex and be provided social media information associated with individuals located in the entry way. The social media information may be provided by the server 115 of the videoconferencing system 100, for example.

Additionally or alternatively, the user, through the same or additional interfaces, may input conditions that will allow the local computing device 120 and the robotic stand 125 to operate autonomously in accordance with said conditions. For example, a user at a remote computing device 105 may set conditions for the local computing device 120 to automatically move (pan and/or tilt) to face whatever partner (or other local computing device) is speaking.

Figure 3:
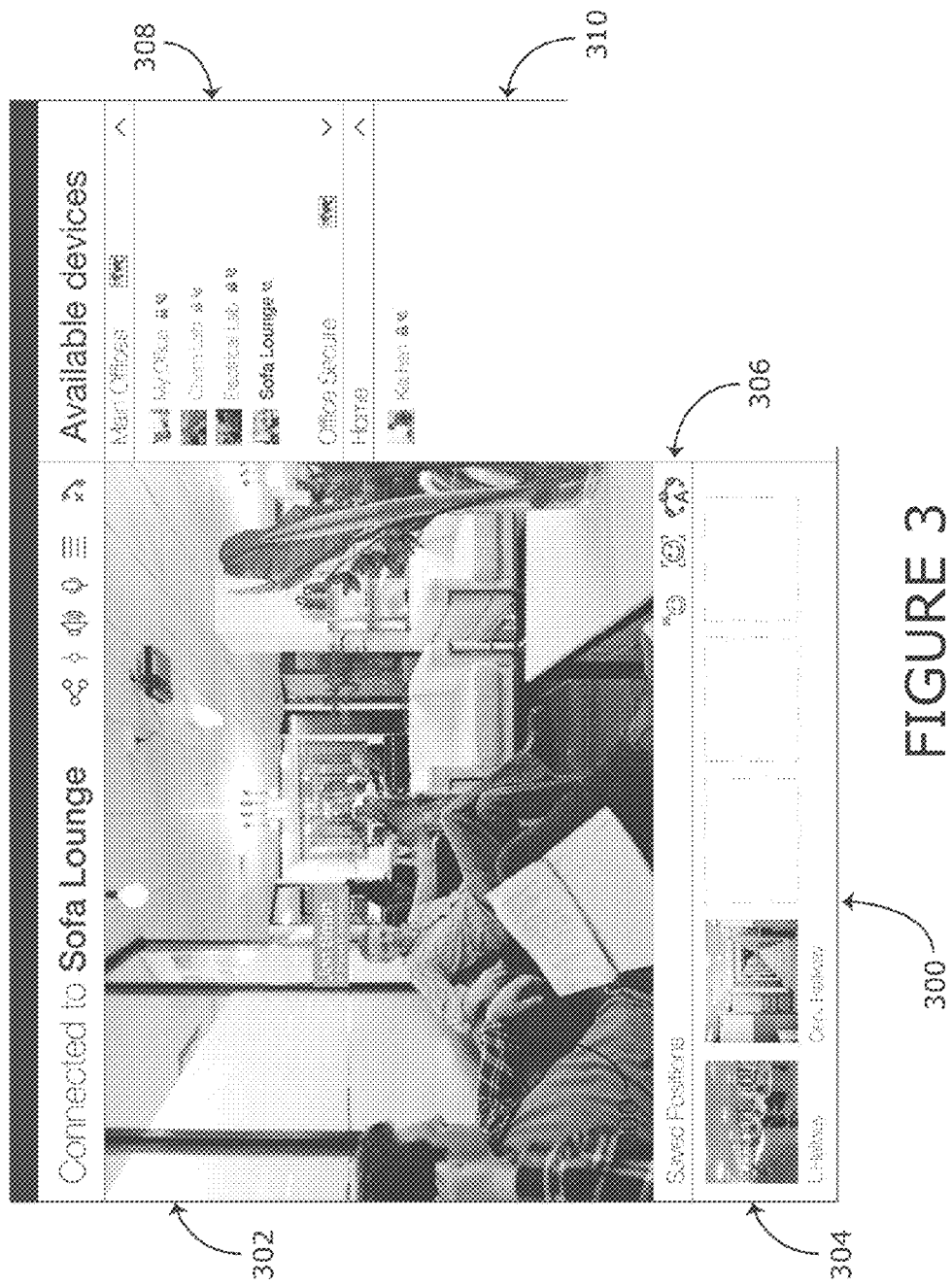
FIG. 3 is an example interface for interacting with one or more local computing devices in accordance with an embodiment of the disclosure.

FIG. 3 is an example office interface 300 for interacting with one or more local computing devices in accordance with an embodiment of the disclosure. The interface 300 may be used to interface with one or more local computing devices 120 mounted on a robotic stand 125 located in various locations in and around an office complex, for example. A user at a remote computing device 105 may select the interface 300 from a web browser module, for example, such as the web browser module 215. The user may then connect with and interact with various locations around an office complex, for example, that may be available through the interface 300. The remote computing device 105 and the local computing device 120 in combination with the robotic stand 125 may be programmed to implement the interface 300 so that the user at their remote computer device 105 interacting with the interface 300 may manipulate one or more local computing devices 120. The interface 300 may be included with the motion control input module 230, the control module 225, the video client module 220, or combinations thereof.

The office interface 300, or simply the interface 300, may have multiple panes for a user to interact with to operate one or more local computing devices 120 mounted on a respective robotic stand 125 placed in various locations around an office complex. For ease of reference herein, a local computing device 120 mounted on a robotic stand 125 may be referred to as a local computing device 120/robotic stand 125 combination. The main view 302 of the interface 300 shows a particular location around an office building that is viewable by a local computing device 120/robotic stand 125 combination. For example, the view 302 is of a sitting area in an office and may just be one view available by the associated local computing device 120/robotic stand 125 combination displaying the view 302 to a user at a remote computing device 105. The view 302 may be a preset view for this particular local computing device 120/robotic stand 125 combination. The pane 304 of the interface 300 may show other preset views available for this particular local computing device 120/robotic stand 125 combination.

A user, via their remote computing device 105 displaying the interface 300, may select one of the two images shown in the pane 304 to move the viewing area of the local computing device 120 by the robotic stand 125 to view those areas within the office complex. The pictures/icons shown in the pane 304 may be a still frame taking at a prior time, at installation of the local computing device 120/robotic stand 125 combination for example, or they may dynamically update based on the last time the local computing device 120/robotic stand 125 combination was viewing that direction. The pane 304 depicts other available presets that have yet to be populated, which are shown by the dotted lines. A user may manually move the local computing device 120/robotic stand 125 combination and store other views in the unused preset locations.

The icons shown in pane 306 offer user functions for manipulating the local computing device 120/robotic stand 125 combination. For example, the icon at the far right may, by selecting, cause the local computing device to autoscan the viewspace and store locations of individuals appearing in the viewspace. These stored locations may then be selected by a user to automatically move the local computing device 120/robotic stand 125 combination to view that individual. The middle icon, shown as a face in a segmented square, if selected, may center the viewspace on an individual. If there is only one individual shown, then the local computing device may center the main view 302 on that individual. If, however, there are multiple options, then the user may be prompted to select the desired target for centering.

The icon on the left in the pane 306 shows a face with a bubble to the top left. This icon, when selected, may cause the interface 300 to display information regarding one or all of the individuals displayed in the main view 302, as depicted by the name above the head of the individual shown in the main view 302. This information may implement facial recognition to determine the identity of the individual, from an employee database for example, and allow the local computing device 120, the server 115, or the remote computing device 105 to access various databases to deliver information regarding the one or more individuals. For example, the remote computing device 105 may access the individuals LinkedIn™ profile and display any common contacts the user of the remote computing device 105 and the individual shown in the main view 302 may have. Additionally, any number of databases and social media websites may be accessed and corresponding information overlaid on the interface 300 for viewing by the user of the remote computing device 105. The information accessed may include a whole range of inputs, such as the individual's Twitter™ feed, Facebook™ postings, or any other publicly available information.

The pane 308 of the interface 300 may display other local computing devices 120/robotic stand 125 combinations at various other locations around the office complex, for example, and their status. Their status may show if they are available for using and operating. As discussed above, the status may be unavailable, available, or in use but others may join. As before, the status may be determined by the color of the label for a particular location. In addition to the status of the various locations, the pane 308 may show other settings for each of the locations. Next to the locations are two symbols, a phone and a lock, which may alert a user to settings of the particular location. The phone, depending on its color, may alert a user that the local computing device 120/robotic stand 125 combination at a particular location is set to auto-answer when a user attempts to access it. In auto-answer mode, the user may be automatically given access by selecting the picture for that location. If auto-answer is disabled, a user may require an individual in proximity to the location to answer the call and grant the user access. Further, the lock picture may inform a user that the local computing device 120/robotic stand 125 combination at that location may require a password to be entered before access is to be granted.

A user may select the picture of an available location that includes one or more computing device 120/robotic stand 125 combinations as shown in the pane 308 to transfer to that location. If the user were to select the location labeled "Electrical Lab," for example, the user may then be prompted to enter a password before being granted access to the local computing device 120/robotic stand 125 combination located in the Electrical Lab. The interface 300 may then show any preset locations for that particular location. For example, the interface 400 of FIG. 4 may be displayed in the main view 302 or the interface 400 may replace the interface 300 on a user's remote computing device 105 to show the available locations. When one of the other available local computing device 120/robotic stand 125 combinations is selected, the view shown in the main view 302 may change to an associated camera view or interface schematic of the area.

The pane 310 may show other local computing devices 120/robotic stand 125 combinations available to or known by a user, their location, and their status. A user, for example, may have a local computing device 120/robotic stand 125 combination at their house that they may access through the web portal. These additional locations may be associated with a user profile and stored as such.

The pane 312 may give a user control functions of local computing device 120. For example, a user may be able to adjust a volume level and microphone level of the local computing device 120, end a session or call with that particular device. Additionally, other views of the office or other interfaces may be accessed through this pane. For example, a plan view of the office complex showing the location of the various local computing devices may be accessed by selecting the icon on the left. Various other functionalities may be added to the pane 312 at any time through software updates.

Figure 4:
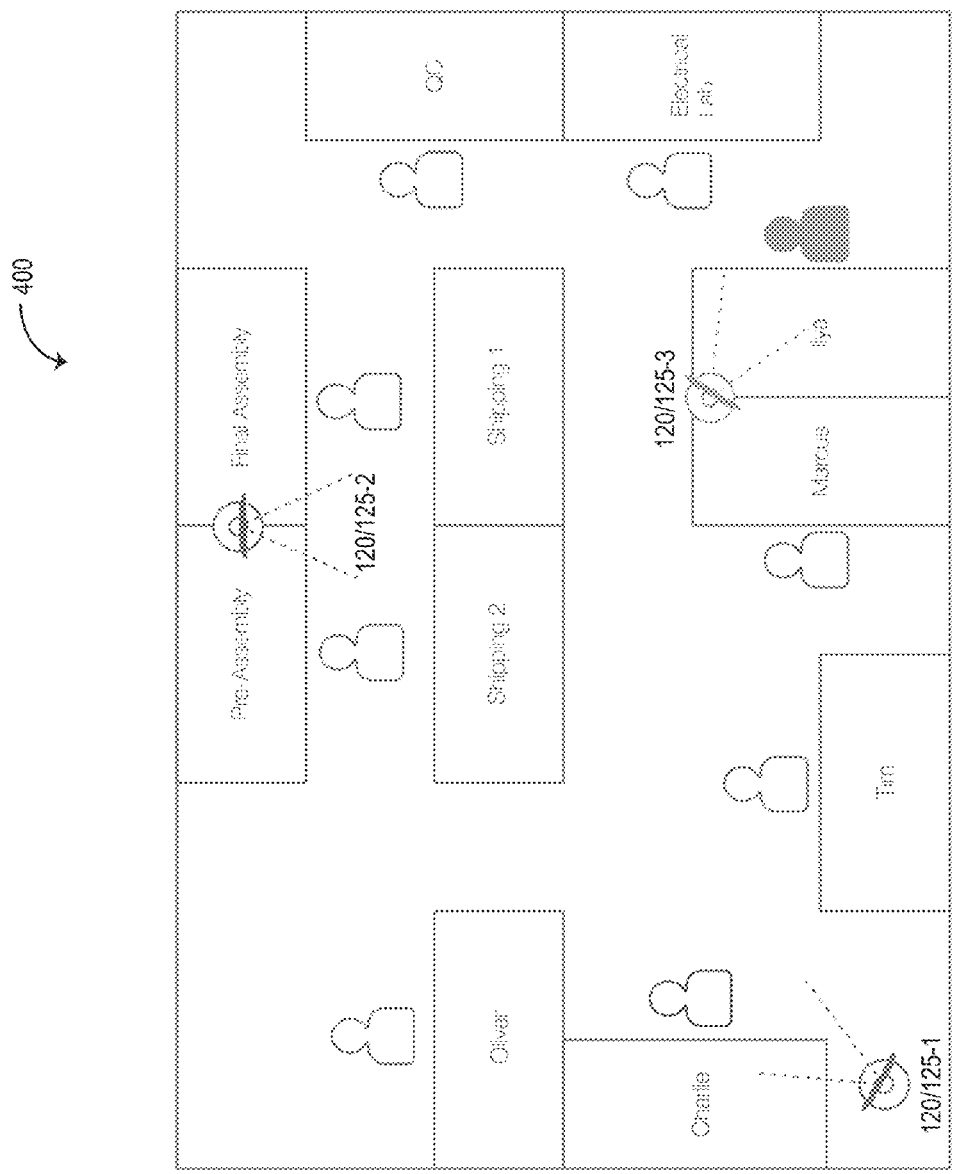
FIG. 4 is an example schematic view of a workspace interface in accordance with an embodiment of the disclosure.

FIG. 4 is an example schematic view of a workspace interface 400 in accordance with an embodiment of the disclosure. The workspace interface 400, which may simply be referred to as the interface 400, may be displayed as a user interface for interacting with various individuals located in the workspace using the videoconferencing system 100. The interface 400 may be a part of a videoconferencing software or standalone software executed by the local computing device 120, the remote computing device 105 and/or the servers 115 of the system 100. The interface 400 may allow a user stationed at a remote computing device 105 to manipulate one or more of the local computing devices 120/robotic stands 125 combinations.

A user of a remote computing device 105 may select the view 400 from, for example, a list of available views, as shown in the pane 308 of the interface 300. The interface 400 may allow the user at the remote computing device 105 to interact with the various local computing devices 120/robotic stands 125 combinations and workspaces shown therein. The interface 400 may be part of one or more of the control modules 225, 275, the web browser module 215, the motion control input module 230, the video client module 220, or combinations thereof. The interface 400 and all corresponding functions accessible therein may be programmed so that the user at their remote computing device 105 interacting with the interface 400 may manipulate one or more local computing devices 120/robotic stands 125 combinations. The example schematic interface 400 shows a plan view of a workspace with a number of desks and stations shown throughout the workspace and may be referred to as the workspace interface 400 or simply the interface 400. The interface 400 also shows the location of several local computing devices 120/robotic stand 125 combinations.

Three local computing device 120/robotic stand 125 combinations are shown in the workspace labeled 120/125-1, 120/125-2, and 120/125-3. The field of view of a camera associated with the local computing device 120 is depicted by the dashed lines. The three local computing device 120/robotic stand 125 combinations may be accessed by one or more users from their respective remote computing devices 105 in order to interact with individuals located at various positions within the workspace depicted by the interface 400. Additionally, not shown in FIG. 4, each local computing device 120/robotic stand 125 combination icon may be shown in different colors that inform a potential user of their respective state of use. For example, a local computing device that is shown in red may mean that it is in use and that no other user may join. Green may indicate that the local computing device 120/robotic stand 125 combination is free and available, and yellow may indicate that the local computing device 120/robotic stand 125 combination currently has at least one user but is available for multiple users to join. A user may select one of the local computing device 120/robotic stand 125 combinations, as long as it is available, to interact with local positions by clicking (by mouse or touch screen) the desired local computing device 120/robotic stand 125 combination. Once the session has begun, the user may operate the local computing device 120 to move its robotic stand 125 and face a desired direction and/or individual within the workspace. Alternatively, a user may select a position on the interface 400, Oliver for example, and the user interface 400 may select the best local computing device 120/robotic stand 125 combination for interacting with Oliver. For example, if device 120/125-1 is available, then the user interface 400 may select that device for the user. However, if device 120/125-1 is not available, then the user interface 400 may use the next best option, which may be the device 120/125-2 in this example. As such, a user may have two options for selecting a device for interacting with the various positions within the workspace—by selecting a specific local computing device 120/robotic stand 125 combination or by selecting the desired position within the workspace and letting the user interface 500 determine what device to use. It is described that the interface 400 is making determinations, but the determinations may be made by the server 115, the control module 225, the motion control input module 230, or combinations thereof.

When multiple users are sharing a single local computing device 120/robotic stand 125 combination, the control of that device may be implemented in various manners. For example, the user that initiated the video conference may maintain control until they terminate their feed or until they grant another user control. Alternatively, control may periodically transfer from one user to another in a determined or random fashion so that control varies during the duration of the video conference. Various other methods may be known and implemented by those of skill in the art such as voting by all users for a specific view to place the local computing device 120.

Additionally, each of the positions shown in the workspace may be stored by the local computing device 120/robotic stand 125 combinations so that a user of a remote computing device 105 associated with a local computing device 120 may command the robotic stand 125 to move the local computing device 120 to view a specific position by selecting that position on the interface 400. The selection of the position may be through the click of a mouse cursor on that position or by touching that position if the remote computing device 105 includes a touchscreen display. Coordinates for the pan, tilt, or other direction of the local computing device/robotic stand combination may be associated with each of the locations shown in FIG. 4, for example. Selecting one of the illustrated positions in the displayed interface may cause the robotic stand 125 to pan, tilt, and/or rotate to a position such that the illustrated individual may be viewed by the remote user of the local computing device 105.

Figure 5:
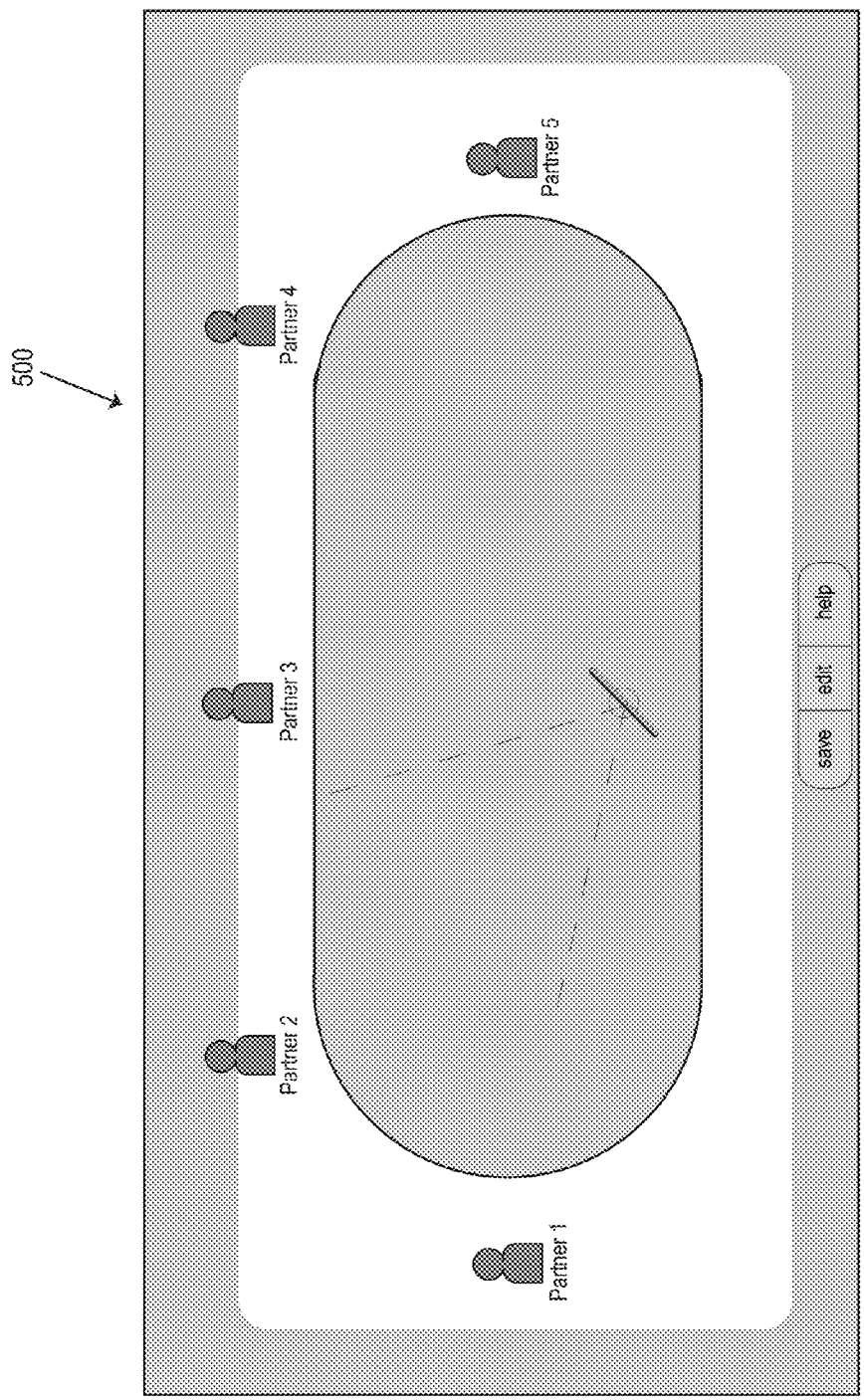
FIG. 5 is an example schematic view of a conference room which may be displayed as a user interface in accordance with an embodiment of the disclosure.

FIG. 5 is an example schematic view of a conference room which may be displayed as a user interface 500 in accordance with an embodiment of the disclosure. The interface 500 may be used with the videoconferencing system 100, and may be accessed through the interface 300 or it may be accessed directly through a web-portal or link sent to a remote user. The example interface 500 shows a plan view of a conference room table with a number of locations shown around the perimeter of the table and may be referred to as the conference room interface 500 or simply the interface 500. The interface 500 may be part of a videoconferencing software or standalone software executed by the local computing device 120, the remote computing device 105 and/or the servers 115 of the system 100. The conference room interface 500 may allow a user of a remote computing device 105 to manipulate a local computing device 120/robotic stand 125 combination located at a position in the conference room as represented by the interface 500. The interface 500 may be accessible to the user through the web browser module 215, the control module 225, the motion control input module 230, the video client module 220, or combinations thereof.

The local computing device 120/robotic stand 125 combination is shown on one side of the table and is shown to be pointed in a specific direction. The field of view of a camera associated with the local computing device 120 is depicted by the dashed lines and shows that the local computing device 120 is facing the Partner 2 location. The Partner locations 1-5 may each be occupied by an attendee or another local computing device 120 mounted to a respective robotic stand 125. Additionally, each of the Partner locations 1-5 may be stored by the interface 500 so that a user of a remote computing device 105 associated with the local computing device 120 may command the robotic stand 125 to move the local computing device 120 to view a specific Partner location by selecting that Partner location on the interface. The selection of the Partner location may be through the click of a mouse cursor on that Partner or by touching that Partner location if the remote computing device 105 includes a touchscreen display. Coordinates for the pan, tilt, or other direction of the local computing device/robotic stand combination may be associated with each of the locations shown in FIG. 5, for example. Selecting one of the illustrated partners in the displayed interface may cause the robotic stand to pan, tilt, and/or rotate to a position such that the illustrated partner may be viewed by the remote user of the local computing device.

The illustrated Partners (and in some examples, other elements which may be displayed in the schematic view such as, but not limited to, white boards, chalkboards, displays, screens, or other objects in the room) may accordingly be dynamic elements having coordinates associated with them for causing the robotic stand to orient the local computing device toward the object. Coordinates of the Partner locations and any other elements may need to be stored by the interface 500 in the memory 255 of the local computing device 120 during a setup stage, for example, which may be performed by a user from a remote computing device 105 or from a technology administrator installing the local computing device 120/robotic stand 125 combination in the conference room. The stored locations, as discussed, may be used as icons for moving the local computing device 120/robotic stand 125 combination by a user with a single selection of the icon in the interface 300.

Figure 6A:
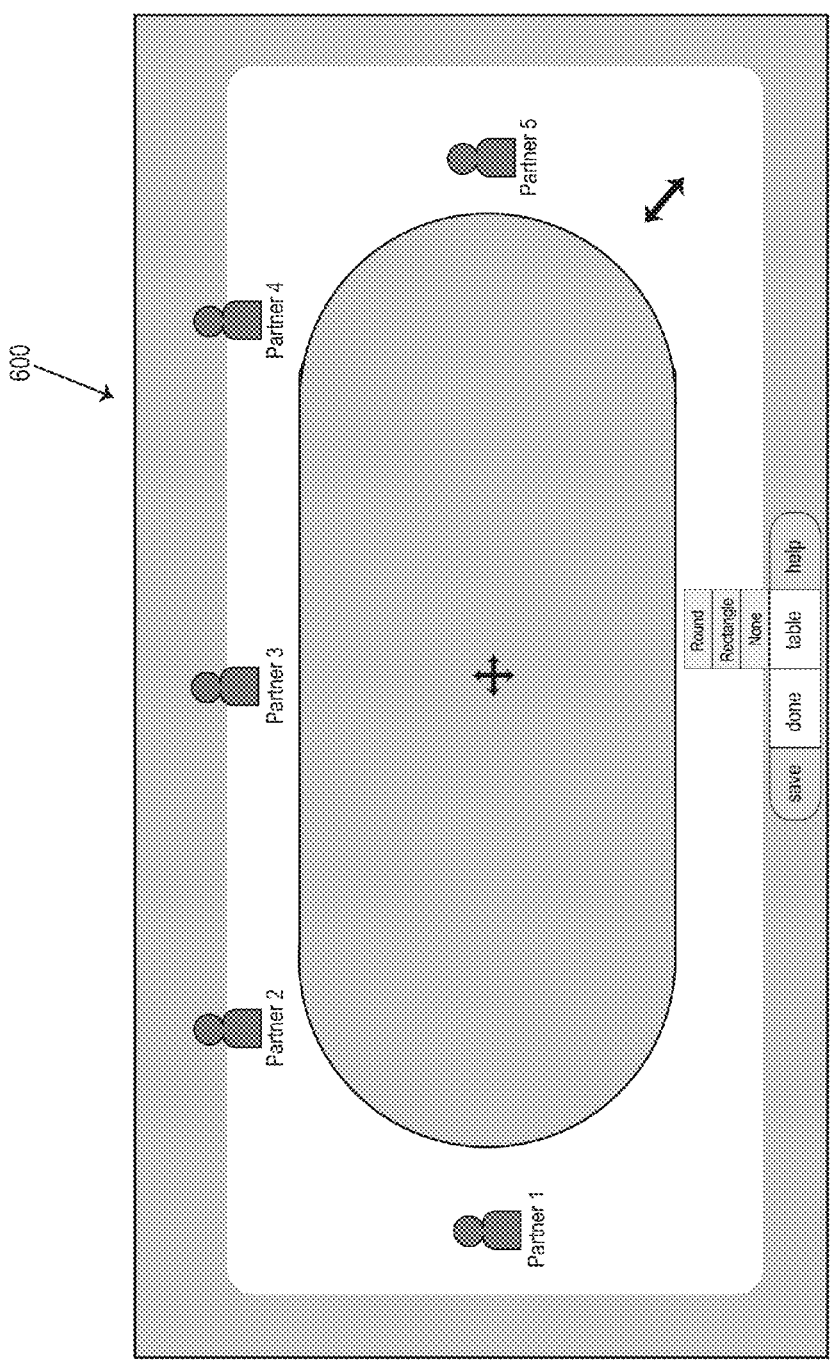
FIG. 6A is an example static object editing interface of one conference room editing mode in accordance with an embodiment of the disclosure.
Figure 6B:
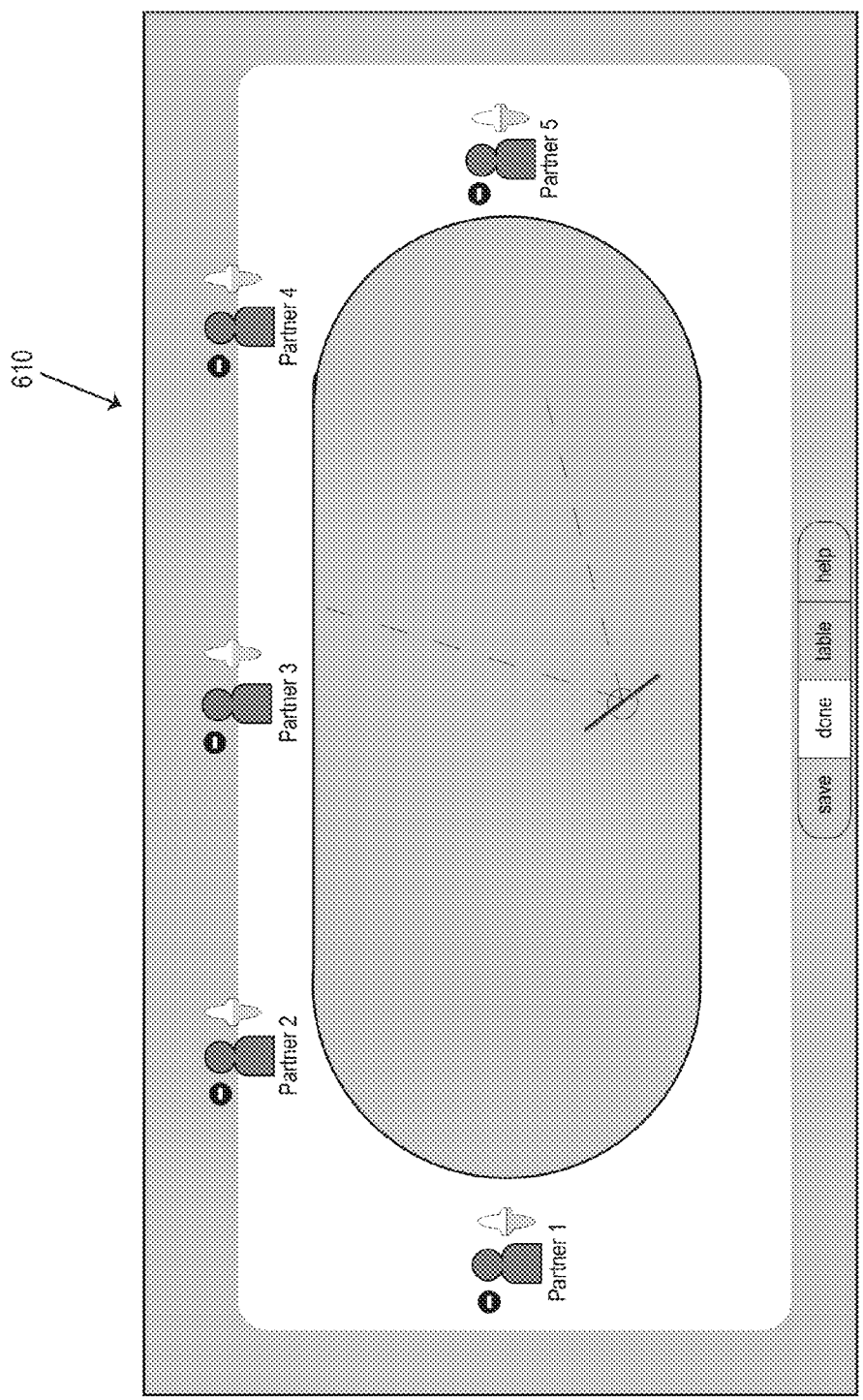
FIG. 6B is an example dynamic object editing interface of another conference room editing mode in accordance with an embodiment of the disclosure.

FIGS. 6A and 6B are example interface schematics of two editing modes of the conference room mode. FIG. 6A is an example static object editing interface 600 of one conference room editing mode in accordance with an embodiment of the disclosure and FIG. 6B is an example dynamic object editing interface 610 of another conference room editing mode in accordance with an embodiment of the disclosure. The two editing modes may be part of the conference room mode and may be implemented when a videoconferencing session occurs, or prior to the occurrence of the session. Before the videoconferencing session takes place, a technology administrator or a physical (or virtual) attendee to the videoconference session may configure the conference room mode of the system 100. The technology administrator may configure the conference room mode through the local computing device 120. The configuration may utilize the static object editing interface 600 to configure a physical layout of the conference room, e.g., the shape (square, round, oval) and size of the conference room table and the number and location of the Partner positions. This configuration may help virtual attendees to get the feel of the room and have an understanding of where the other virtual/real attendees are located with respect to their local computing device 120's location in the actual conference room. Additionally, the technology administrator may also need to install the local computing device 120/robotic stand 125 combinations at various positions around the conference room table.

After the static configuration of the conference room is configured, the technology administrator may then configure the conference room mode for dynamic objects using the dynamic object editing interface 610. The editing interface 610 may be used to configure the local computing device 120/robotic stand 125 combinations that are physically in the conference room to have preset locations for each of the Partner locations around the conference room table. Each stored location may include a pan location and a tilt amount so that the local computing device 120 is properly facing any individual or other local computing device 120 at each of the occupied Partner locations. The dynamic configuration may take place before any or all of the attendees are in place, but may be done once they are all seated. For example, if a tall attendee is located at Partner location 4 (of FIG. 5), then the dynamic object editing interface 610 may be used to set a pan location so that the local computing device 120 pans to Partner location 4 and a tilt amount, likely up in this instance, may also be set. Once the tilt and pan for Partner location 4 is set, the user of the local computing device 120 through the conference room mode interface of FIG. 5 may select the Partner 4 location and the local computing device 120 by the robotic stand 125 may be automatically moved to face the attendee in that location. As shown in FIG. 6B, a pan location and tilt amount may be associated with each Partner location around the conference room table schematic. The slider to the right of the Partner image is for adjusting the tilt. The circle to the left of the Partner images head is for deleting that position indicating that that location is not occupied. The image of the local computing device 120 may be rotated to associate a pan location for each of the Partner locations.

Alternatively or additionally, the technology administrator setting up the physical conference room with the local computing device 120/robotic stand 125 combination may only configure the static objects of the room, e.g., the size and shape of the conference room table and the potential Partner locations. Then, once the videoconference has begun, the user of the local computing device 120 may use the dynamic object editing interface to set a pan location and a tilt angle for each attendee.

The users of the local computing devices 120 through their respective remote computing devices 105 may have other options through the conference room mode. The conference room mode interface 500 may allow a user to set their local computing device 120/robotic stand 125 combination to automatically track an attendee so that if the attendee were to get up and move around the local computing device 120 may continuously face that attendee. The tracking could be done by monitoring and using the changing pixel patterns of the video camera associated with the local computing device 120. Alternatively, the local computing device 120 may employ audio tracking via the speaker array assuming the attendee on the move is also speaking. This function may be useful if there is a white board in the conference room and an attendee gets up to utilize the white board while speaking.

The movement of the local computing device 120 may also allow a user to instruct it to track the face and eyes of a Partner when that Partner is in view. For example, if facial and eye tracking are engaged and the person in view looks off to one side and up, the local computing device 120 may instruct the robotic stand 125 to follow the eye/face movement of that person so that the user of the local device 120 may see what caught that person's attention. It may be another attendee at a conference room table or another individual walking into the room. In this way, the user of the local computing device 120 may be able to better interact with the surrounding of the local computing device 120.

On the other hand, the local computing device 120/robotic stand 125 may be limited in its viewable area and/or controlled by the user of the remote computing device based on access privileges. The access privileges may be assigned to the remote user based on their association with the group hosting the local computing device 120/robotic stand 125 combination. Limiting the viewable area, or virtual blinders, may be implemented when a videoconference is initiated with individuals from another organization, for example, and occurring in a sensitive location. By limiting the viewable area or limiting the control of the other individual, the videoconference may occur without worry of the person from the other organization viewing sensitive information.

The conference room mode via the interface 500 may also allow the user of the local computing device 120 to control various aspects of the conference room, if permission to do so is granted. The user may be able to adjust lighting levels, volume of speakers in the conference room and control of a projector system. For instance, if the user is giving a presentation to be displayed on a screen, the user may be able to control the presentation sequence, adjust lighting levels down for better viewing, and alter the volume on a local speaker. Additionally, if the user may also have access and control of a speakerphone in the conference room that she can use to call other individuals during the videoconference without asking an attendee in the conference room to assist.

Figure 7:
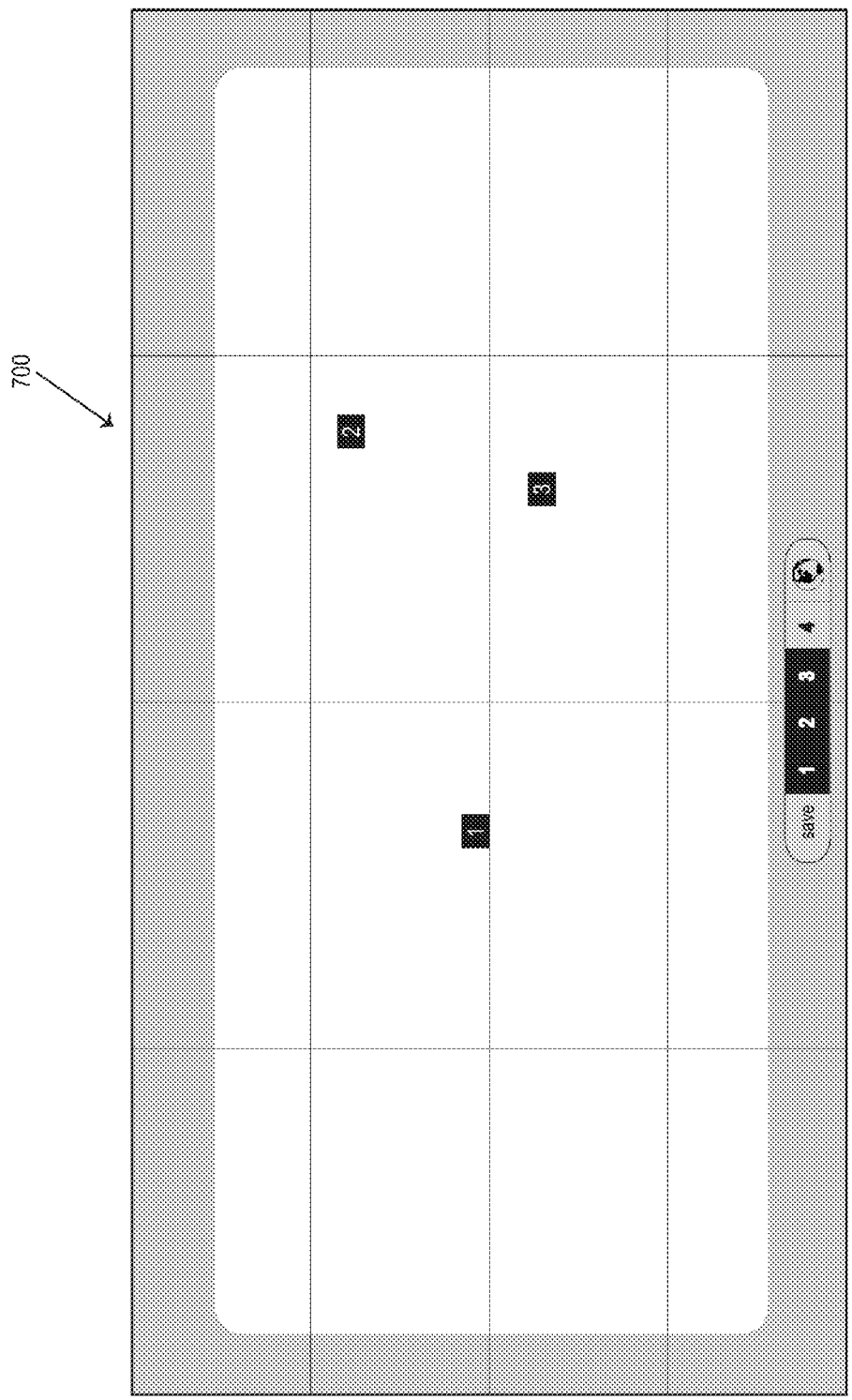
FIG. 7 is a schematic diagram of a grid control user interface showing stored locations in accordance with an embodiment of the disclosure.

FIG. 7 is a schematic diagram of a grid control user interface 700 showing stored locations in accordance with an embodiment of the disclosure. The grid view 700 may be overlaid on top of the video feed shown at a remote computing device 105 or may be an interface of the control software of the videoconferencing system 100. The grid view 700 may be switched to from another view/interface of the control software. Further, any positions saved on a previous interface or mode of the control software may also show up after switching to the grid view 700. For example, if a user switched from the conference room mode as shown in FIG. 5 and three of the Partner locations were saved, then those three Partner locations would show up in the grid view 700. The saved Partner locations may be represented by the boxes 1-3. The user, however, may be prompted with a box asking if any or all of the saved positions should be replicated in the new view. The user, at that prompt, may be able to clear some or all of the saved positions.

Figure 8:
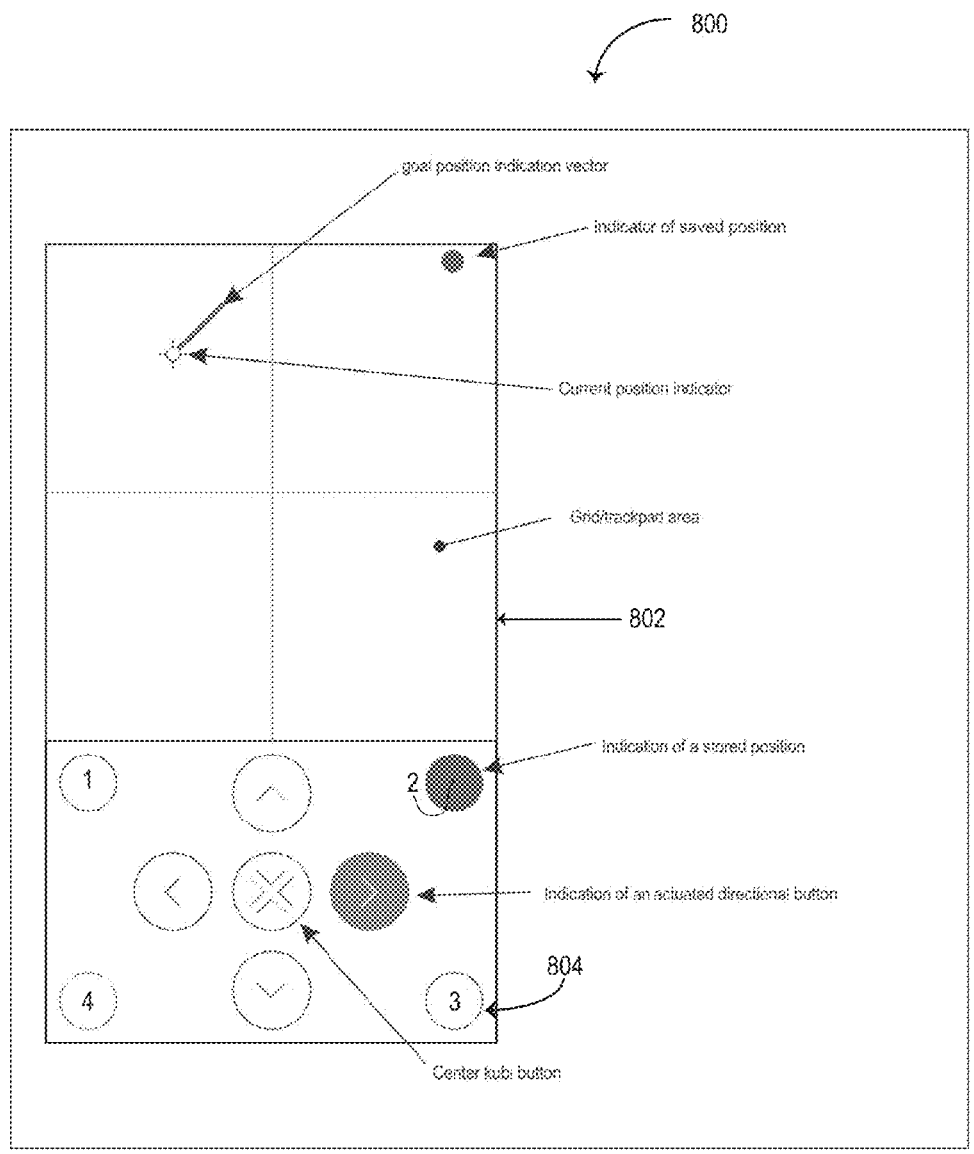
FIG. 8 is a schematic diagram of a mobile grid control user interface showing stored locations in accordance with an embodiment of the disclosure.

FIG. 8 is a schematic diagram of a mobile grid control user interface 800 showing stored locations in accordance with an embodiment of the disclosure. The mobile interface 800 may be overlaid on top of the video feed shown at a remote computing device 105 or may be an interface of the control software of the videoconferencing system 100. The mobile interface 800 may be switched to from another view/interface of the control software. Further, any positions saved on a previous interface or mode of the control software may also show up after switching to the mobile interface 800. For example, if a user switched from the workspace mode as shown in FIG. 5 and three of the positions were saved, then those three positions would show up in the mobile interface 800. The saved positions may be represented by the circles 1-4. The user, however, may be prompted with a box asking if any or all of the saved positions should be replicated in the new view. The user, at that prompt, may be able to clear some or all of the saved positions.

The mobile view 800 offers additional control from a mobile device, which may allow a user on a tablet or smartphone to control the position of a local computing device 120/robotic stand 125 combination. In addition to saving locations, as depicted by the filled in circle 2, which is displayed as a small colored dot at the top right of the upper grid 802, each stored position may have a different color that corresponds between the circles 1-4 and the small dots displayed on the upper grid 802. After a position is stored, a user may move the local computing device 120 with the robotic stand 125 to that position by either selecting one of the circles 1-4 located in the bottom control portion 804 or by selecting a corresponding small dot located in the upper grid 802.

Additionally, a user may be able to manually manipulate the view of the local computing device 120 by panning and/or tiling the device. A user may control the robotic stand 125 of the local computing device 120 either through the control buttons located in the bottom control portion 804 or through the upper grid 802. When using the bottom buttons, the user may hold a button pointing in the direction the user would like the local computing device to move. The length of time the user holds the button will determine the amount of movement of the device. Further, the device may not move until after the user removes pressure from the button. Button here refers to an icon or location of a touch screen device. The button in the middle of the four control buttons may center the local computing device 120, e.g., center an individual in the viewing area.

The user may also move the local computing device 120 by placing a finger on the upper grid 802 and moving the finger in the direction the user would like to move the local computing device 120 as shown by the current position indicator and the goal position indicator vector labels on FIG. 8. The distance and direction on the upper grid 802 that the user moves their finger (or stylus) may determine the movement and final location of the local computing device 120. The local computing device 120, however, may not move until the user releases his finger from the touch screen and/or upper grid 802.

The provided user interface examples may be implemented using any computing system, such as but not limited to a desktop computer, a laptop computer, a tablet computer, a smart phone, or other computing systems. Generally, a computing system 105 for use in implementing example user interfaces described herein may include one or more processing unit(s) 210, and may include one or more computer readable mediums (which may be transitory or non-transitory and may be implemented, for example, using any type of memory or electronic storage 205 accessible to the computing system 105) encoded with executable instructions that, when executed by one or more of the processing unit(s) 210, may cause the computing system 105 to implement the user interfaces described herein. In some examples, therefore, a computing system 105 may be programmed to provide the example user interfaces described herein, including displaying the described images, receiving described inputs, and providing described outputs to a local computing device 120, a motorized stand 125, or both.

Further, the interfaces discussed above may also include keyboard shortcut commands and/or icons configured to make the local computing device 120/robotic stand 125 perform various predetermined actions. The keyboard shortcut commands and the clickable icons may be preset or configurable by a user and/or an administrator. The commands, using an initiation mechanism (e.g. selecting an icon, typing a command), may cause the local computing device 120/robotic stand 125 to perform motion-based gestures that others would interpret as body language-type communication. For example, a user at a remote computer may click on a bow icon on their view of the interface 300 that may cause the robotic stand 125 to move the local computing device 120 in an up and down forward arc to convey a bow. Other gestures may include shaking the local computing device up and down to signify a "yes" response and side to side to signify a "no" response. The inclusion of icons or other interfaced for commanding the robotic stand to perform a selected gesture may allow the local computing device 120/robotic stand 125 combination an additional mechanism for conveying communication to the other user(s) located in the conference room or other venue.

An additional scenario for the videoconferencing system 100 may be where a single user at a remote computing device is simultaneously interacting through and controlling multiple local computing devices 120/robotic stands 125 combinations. In this scenario the user may be prompted with an interface that shows a matrix of boxes with each box showing the view of a respective local computing device 120. The user may be able to select a box to manipulate the view of the associated local computing device 120.

Alternatively, when there are several remote users associated with their own local computing device 120/robotic stand 125, each of the remote users may be able to view the video feed from one, some, or all of the other video feeds. Similar to above, each remote user may have a matrix of boxes on their interface with each box showing the view of a respective local computing device 120. In this operational mode, each remote user may be granted varying degrees of control/access for each of the viewable local computing devices 120 shown on their matrix. The degrees of control/access may range from only viewing and listening to the feed, being able to speak without sending video, to full access and control to another local computing device 120.

Further, the software and interfaces for controlling the local computing device 120/robotic stand 125 combination may be web-based and accessible from any remote computing device 105 with an internet connection. The remote computing device 105 in this scenario could be physically located just about anywhere. To take advantage of the full video conferencing capabilities the remote computing device may need a video camera, but the system 100 may operate without a video feed from a remote computing device 105. A user in this scenario may only need to be sent a link via email or text message that may be followed. The link may lead to a web-based portal with all of the interfaces discussed herein accessible. The link may be sent from an administrator setting up the videoconference or from another remote attendee. If sent by a remote attendee, the remote attendee may be able to send a link that would pull up a portal that replicates the sender's portal, e.g., a matrix of other views, pre-configured conference room mode with Partner locations, etc. The sending user, however, may be able to set control levels for the new user on any number of the available local computing devices 120.

Figure 9:
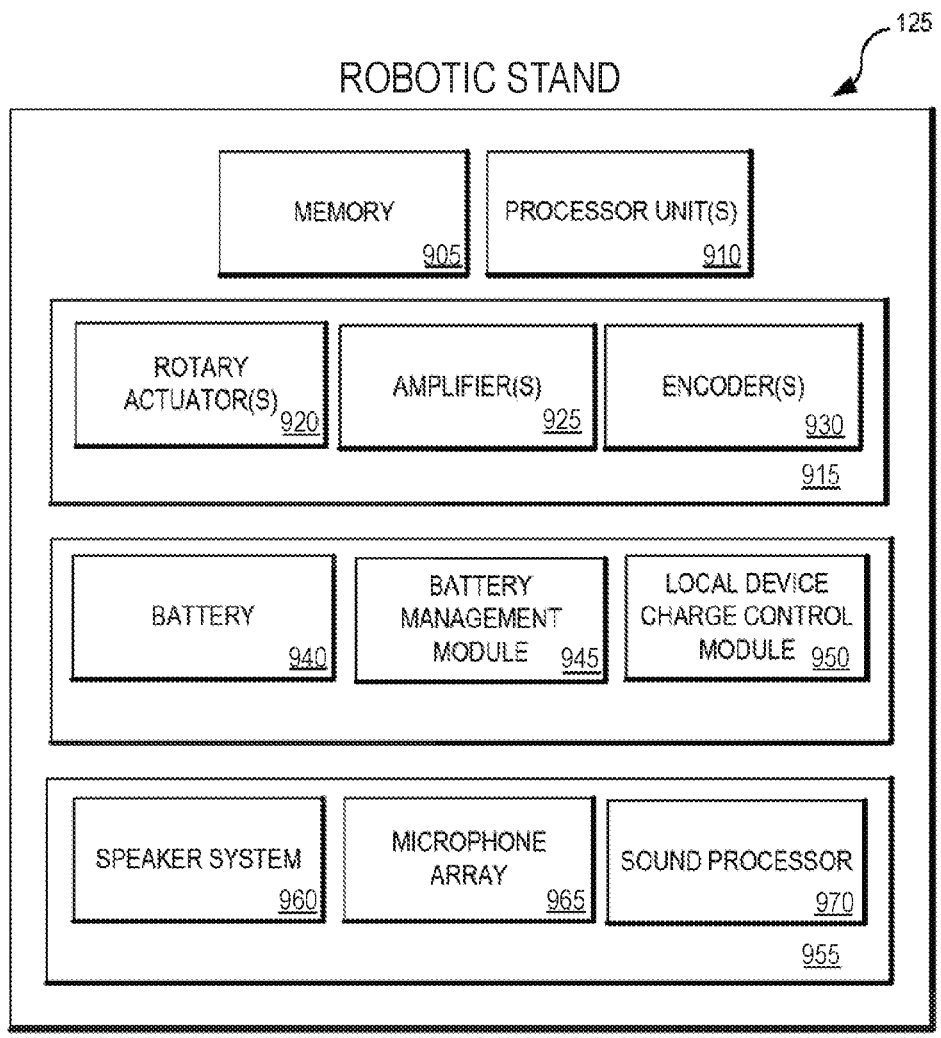
FIG. 9 is a schematic diagram of a robotic stand in accordance with an embodiment of the disclosure.

With reference to FIG. 9, the robotic stand 125, which may be referred to as a motorized or remotely-controllable stand, may include a memory 905, one or more processor units 910, a rotary actuator module 915, a power module 935, a sound module 955, or any combination thereof. The memory 905 may be in communication with the one or more processor units 910. The one or more processor units 910 may receive motion control data including motion commands from the local computing device 120 via a wired or wireless data connection. The motion control data may be stored in memory 905. The one or more processor units 910 may process the motion control data and transmit motion commands to a rotary actuator module 915. In some implementations, the one or more processor units 910 include a multipoint control unit (MCU).

With continued reference to FIG. 9, the rotary actuator module 915 may provide control of an angular position, velocity, and/or acceleration of the local computing device 120. The rotary actuator module 915 may receive a signal containing motion commands from the one or more processor units 910. The motion commands may be associated with one or more rotational axes of the robotic stand 125.

With further reference to FIG. 9, the rotary actuator module 915 may include one or more rotary actuators 920, one or more amplifiers 925, one or more encoders 930, or any combination thereof. The rotary actuator(s) 920 may receive a motion command signal from the processor unit(s) 910 and produce a rotary motion or torque in response to receiving the motion command signal. The amplifier(s) 925 may magnify the motion command signal received from the processor unit(s) 910 and transmit the amplified signal to the rotary actuator(s) 920. For implementations using multiple rotary actuators 920, a separate amplifier 925 may be associated with each rotary actuator 920. The encoder(s) 930 may measure the position, speed, and/or acceleration of the rotary actuator(s) 920 and provide the measured data to the processor unit(s) 910. The processor unit(s) 910 may compare the measured position, speed, and/or acceleration data to the commanded position, speed, and/or acceleration. If a discrepancy exists between the measured data and the commanded data, the processor unit(s) 910 may generate and transmit a motion command signal to the rotary actuator(s) 920, causing the rotary actuator(s) 920 to produce a rotary motion or torque in the appropriate direction. Once the measured data is the same as the commanded data, the processor unit(s) 910 may cease generating a motion command signal and the rotary actuator(s) 920 may stop producing a rotary motion or torque.

The rotary actuator module 915 may include a servomotor or a stepper motor, for example. In some implementations, the rotary actuator module 915 includes multiple servomotors associated with different axes. The rotary actuator module 915 may include a first servomotor associated with a first axis and a second servomotor associated with a second axis that is angled relative to the first axis. The first and second axes may be perpendicular or substantially perpendicular to one another. The first axis may be a pan axis, and the second axis may be a tilt axis. Upon receiving a motion command signal from the processor unit(s) 910, the first servomotor may rotate the local computing device 120 about the first axis. Likewise, upon receiving a motion command signal from the processor unit(s) 910, the second servomotor may rotate the local computing device 120 about the second axis. In some implementations, the rotary actuator module 915 may include a third servomotor associated with a third axis, which may be perpendicular or substantially perpendicular to the first and second axes. The third axis may be a roll axis. Upon receiving a motion command signal from the processor unit(s) 910, the third servomotor may rotate the local computing device 120 about the third axis. In some implementations, a user of the remote computing device 105 may control a fourth axis of the local computing device 120. For example, a user of the remote computing device 105 may remotely control a zoom functionality of the local computing device 120 real-time during a videoconference. The remote zoom functionality may be associated with the control modules 225, 275 of the remote and local computers 105, 120, for example.

Still referring to FIG. 9, the power module 935 may provide power to the robotic stand 125, the local computing device 120, or both. The power module 935 may include a power source, such as a battery 940, line power, or both. The battery 940 may be electrically coupled to the robotic stand 125, the local computing device 120, or both. A battery management module 945 may monitor the charge of the battery 940 and report the state of the battery 940 to the processor unit(s) 910. A local device charge control module 950 may be electrically coupled between the battery management module 945 and the local computing device 120. The local device charge control module 950 may monitor the charge of the local computing device 120 and report the state of the local computing device 120 to the battery management module 945. The battery management module 945 may control the charge of the battery 940 based on the power demands of the stand 125, the local computing device 120, or both. For example, the battery management module 945 may restrict charging of the local computing device 120 when the charge of the battery 940 is below a threshold charge level; the charge rate of the battery 940 is below a threshold charge rate level, or both.

With continued reference to FIG. 9, the sound module 955 may include a speaker system 960, a microphone array 965, a sound processor 970, or any combination thereof. The speaker system 960 may include one or more speakers that convert sound data received from a remote computing device 105 into sound waves that are decipherable by videoconference participant(s) at the local computing device 120. The speaker system 960 may form part of an audio system of the videoconference system. The speaker system 960 may be integral to or connected to the robotic stand 125.

The microphone array 965 may include one or more microphones that receive sound waves from the environment associated with the local computing device 120 and convert the sound waves into an electrical signal for transmission to the local computing device 120, the remote computing device 105, or both during a videoconference. The microphone array 965 may include three or more microphones spatially separated from one another for triangulation purposes. The microphone array 965 may be directional such that the electrical signal containing the local sound data includes the direction of the sound waves received at each microphone. The microphone array 965 may transmit the directional sound data in the form of an electrical signal to the sound processor 970, which may use the directional sound data to determine the location of the sound source. For example, the sound processor 970 may use triangulation methods to determine the source location. The sound processor 970 may transmit the sound data to the processor unit(s) 910, which may use the source data to generate motion commands for the rotary actuator(s) 920. The sound processor 970 may transmit the motion control commands to the rotary actuator module 915, which may produce rotary motion or torque based on the commands. As such, the robotic stand 125 may automatically track the sound originating around the local computing device 120 and may aim the local computing device 120 at the sound source without user interaction. The sound processor 970 may transmit the directional sound data to the local computing device 120, which in turn may transmit the data to the remote computing device(s) 105 for use in connection with a graphical user interface.

As explained above, various modules of the remote computing device(s) 105, the local computing device 120, and the robotic stand 125 may communicate with other modules by way of a wired or wireless connection. For example, various modules may be coupled to one another by a serial or parallel data connection. In some implementations, various modules are coupled to one another by way of a serial bus connection.

Figures 10A, 10B:
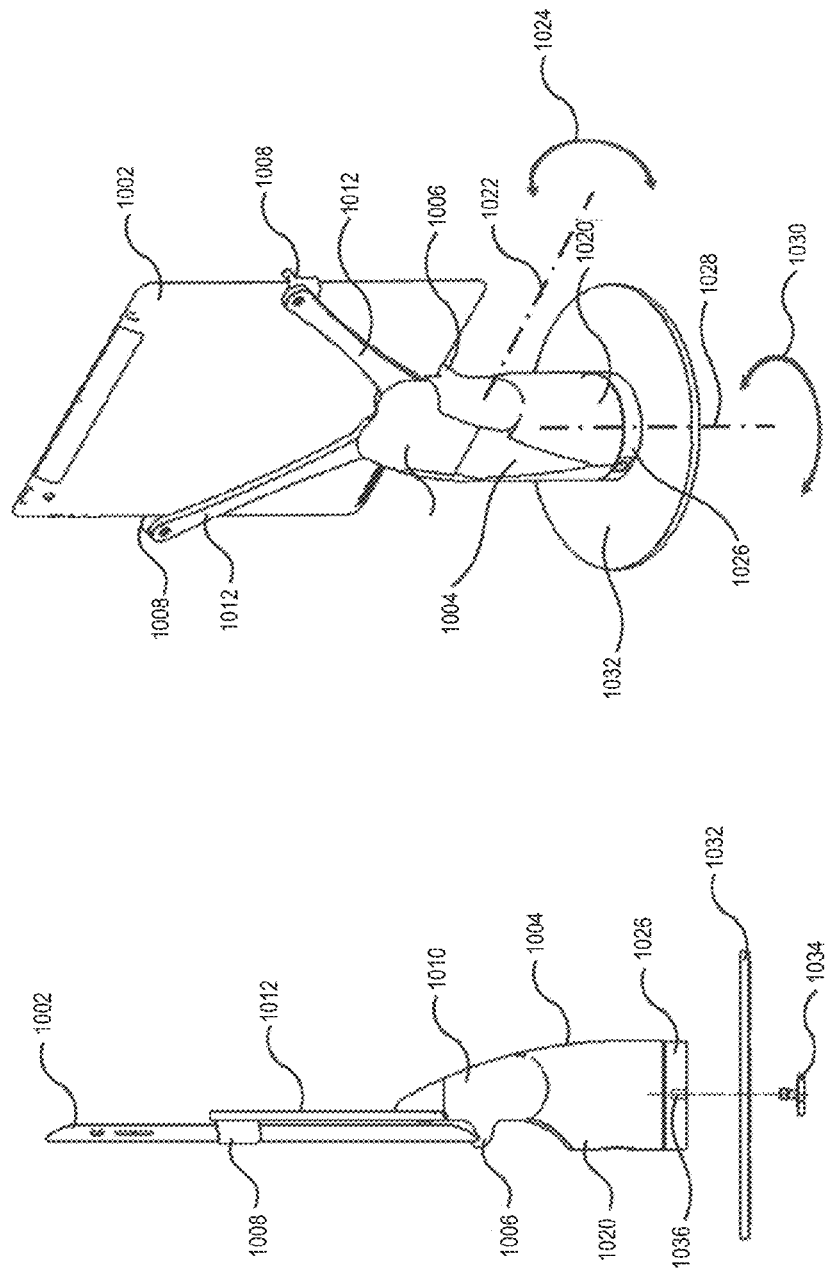
FIG. 10A is a side elevation view of a local computing device mounted onto a robotic stand in accordance with an embodiment of the disclosure.
FIG. 10B is a rear isometric view of a local computing device mounted onto a robotic stand in accordance with an embodiment of the disclosure.

With reference to FIGS. 10A and 10B, an example local computing device 1002 is mounted onto an example robotic stand 1004. The local computing device 1002 may be electrically coupled to the stand 1004 via a wired and/or wireless connection. The local computing device 1002 is depicted as a tablet computer, but other mobile computing devices may be supported by the stand 1004.

Figure 11:
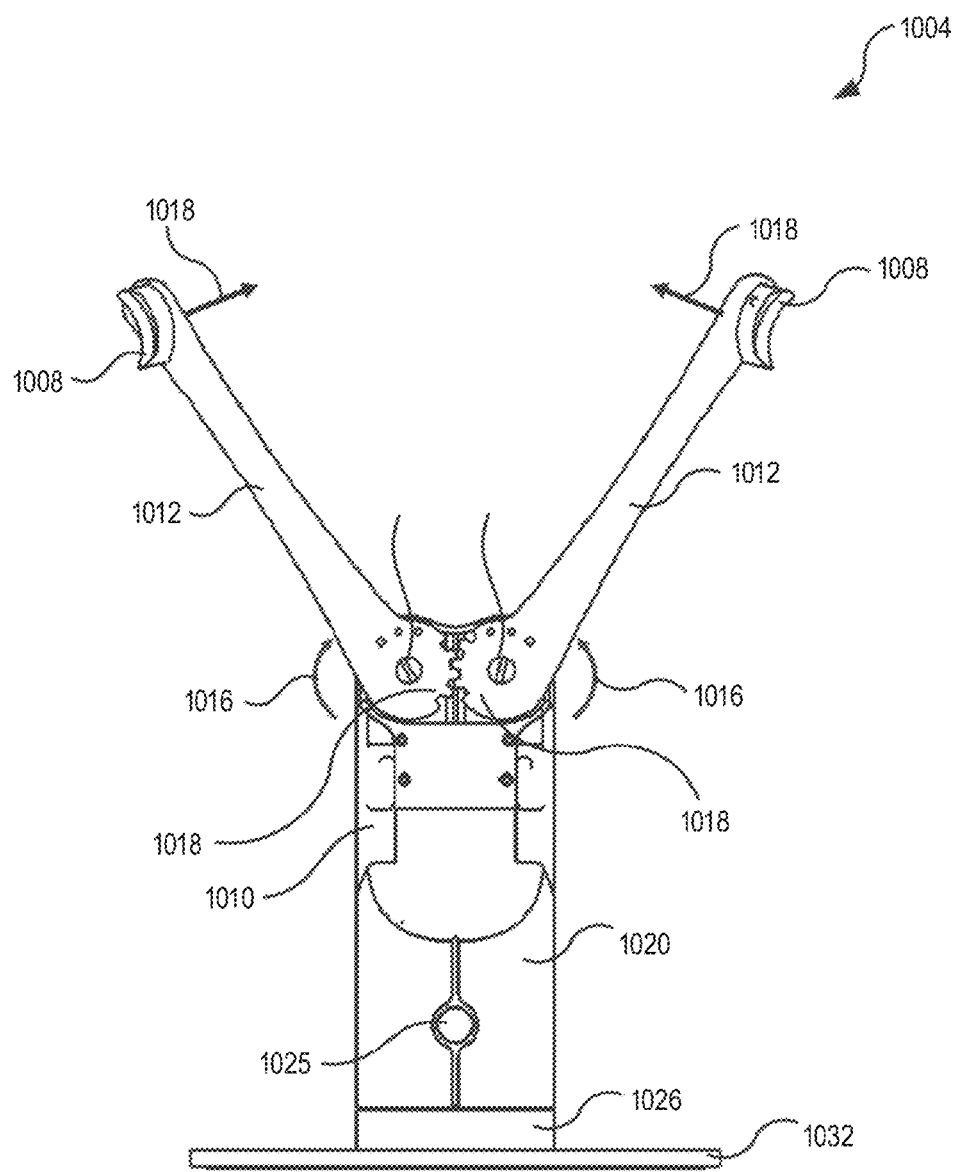
FIG. 11 is a front elevation view of a robotic stand in accordance with an embodiment of the disclosure.

The local computing device 1002 may be securely held by the robotic stand 1004 such that the stand 1004 may move the local computing device 1002 about various axes without the local computing device 1002 slipping relative to the stand 1004. The stand 1004 may include a vertical grip 1006 that retains a lower edge of the local computing device 1002. (see FIG. 10A). The stand 1004 may include horizontal grips 1008 that retain opposing side edges of the local computing device 1002 (see FIGS. 10A and 10B). The vertical and horizontal grips 1006, 1008 may be attached to an articulable arm or tiltable member 1010. The vertical grip 1006 may be non-movable relative to the tiltable member 1010, whereas the horizontal grips 1008 may be movable relative to the tiltable member 1010. As shown in FIGS. 10B and 11, the horizontal grips 1008 may be coupled to the tiltable member 1010 by elongate arms 1012. The horizontal grips 1008 may be rigidly or rotationally attached to free ends of the arms 1012. The other ends of the arms 1012 may be pivotally attached to the tiltable member 1010 about pivot points 1014 (see FIG. 11). The elongate arms 1012 may reside in a common plane (see FIGS. 10A and 10B).

Figure 12:
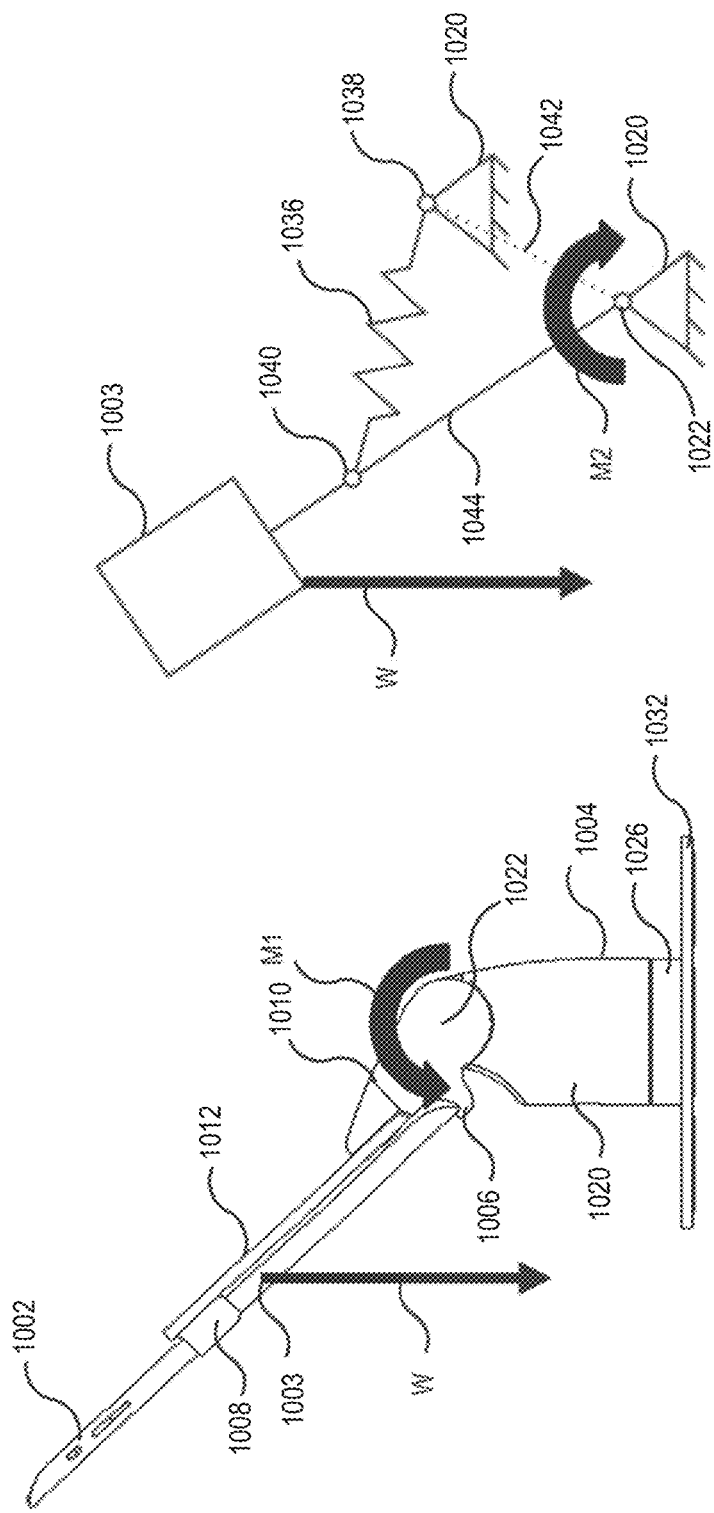
FIG. 12A is a side elevation view of a local computing device mounted onto a robotic stand in a tilted configuration in accordance with an embodiment of the disclosure.
FIG. 12B is a schematic diagram of a local computing device mounted onto a robotic stand in a tilted configuration in accordance with an embodiment of the disclosure.

As shown in FIG. 11, the elongate arms 1012 may be biased toward one another. A spring may be concentrically arranged about the pivot axis 1014 of at least one of the arms 1012 and may apply a moment 1016 to the arms 1012 about the pivot axis 1014. The moment 1016 may create a clamping force 1018 at the free ends of the arms 1012, which may cause the horizontal grips 1008 to engage opposing sides of the local computing device 1002 and compress or pinch the local computing device 1002 between the horizontal grips 1008. In addition to applying a lateral compressive force to the local computing device 1002, the horizontal grips 1008 may apply a downward compressive force to the local computing device 1002 such that the device 1002 is compressed between the horizontal grips 1008 and the vertical grip 1006. For example, the horizontal grips 1008 may pivot in a cam-like motion and/or be made of an elastomeric material such that, upon engagement with opposing sides of the local computing device 1002, the grips 1008 apply a downward force to the local computing device 1002. As shown in FIG. 12, the attached ends of the elongate arms 1012 may include matching gear profiles 1018 that meshingly engage one another such that pivotal movement of one of the arms 1012 about its respective pivot axis 1014 causes pivotal movement of the other of the arms 1012 about its respective pivot axis 1014 in an opposing direction. This gear meshing allows one-handed operation of the opening and closing of the arms 1012.

With reference to FIG. 10B, the tiltable member 1010 may be rotationally attached to a central body or riser 1020 of the stand 1004 about a tilt axis 1022, which may be oriented perpendicularly to the pivot axis 1014 of the elongate arms 1012. A rotary actuator module, such as a servomotor, may be placed inside the tiltable member 1010 and/or the riser 1020 of the stand 1004 and may move the member 1010 rotationally relative to the riser 1020, resulting in a tilting motion 1024 of the local computing device 1002 about the tilt axis 1022. As shown in FIG. 11, a user input button 1025 may be coupled to the riser 1020. The user input button 1025 may be electrically coupled to one or more of the stand components depicted in FIG. 9.

With continued reference to FIG. 10B, the riser 1020 may be rotationally attached to a pedestal 1026. The riser 1020 may be swivelable relative to the pedestal 1026 about a pan axis 1028, which may be oriented perpendicularly to the tilt axis 1022 of the tiltable member 1010 and/or the pivot axis 1014 of the elongate arms 1012. A rotary actuator module, such as a servomotor, may be placed inside the riser 1020 and may move the riser 1020 rotationally relative to the pedestal 1026, resulting in a pan motion 1030 of the local computing device 1002 about the pan axis 1028.

With reference to FIGS. 10A, 10B, and 11, the pedestal 1026 may be mounted to a base 1032, such as a cylindrical plate, a tripod, or other suitable mounting implement. The pedestal 1026 may be removeably attached to the base 1032 with a base mount fastener 1034, which may be inserted through an aperture in the base 1032 and threaded into a threaded receptacle 1036 formed in the pedestal 1026. The base 1032 may extend outwardly from the pan axis 1028 beyond an outer surface of the riser 1020 a sufficient distance to prevent the stand 1004 from tipping over when the local computing device 1002 is mounted onto the stand 1004, regardless of the pan and/or tilt orientation 1024, 1030 of the computing device 1002. In some implementations, the pedestal 1026 may be formed as a unitary piece with the base 1032 and together referred to as a base. The components depicted schematically in FIG. 9 may be attached to the tiltable member 1010, the riser 1020, the pedestal 1026, the base 1032, or any combination thereof. In some implementations, the memory 905, the processor unit(s) 910, the rotary actuator module 915, the power module 935, the sound module 955, or any combination thereof may be housed at least partially within the riser 1020.

With reference to FIGS. 12A and 12B, when mounted onto the stand 1004, the center of mass 1003 of the local computing device 1002 may be laterally offset from the tilt axis 1022 of the tiltable member 1010. The weight W of the local computing device 1002 may create a moment M1 about the tilt axis 1022, which may affect the operation of a rotary actuator, such as a tilt motor, associated with the tilt axis 1022. To counteract the moment M1, a counterbalance spring 1036 may be used to neutralize the moment M1. The spring 1036 may make the tiltable member 1010 and the local computing device 1002 neutrally buoyant. A first end 1038 of the spring 1036 may be attached to the riser 1020, and a second end 1040 of the spring 1036 may be attached to the tiltable member 1010. The first end 1038 of the spring 1036 may be rotationally mounted inside the riser 1020 and may be offset from the tilt axis 1022 of the member 1010 by a distance 1042. The second end 1040 of the spring 1036 may be rotationally mounted inside the tiltable member 1010 and may be offset from the tilt axis 1022 of the member 1010 by a distance 1044. The spring force of the spring 1036 may create a moment M2 about the tilt axis 1022 of the member 1010. The moment M2 may inversely match the moment M1, thereby neutralizing the weight W of the local computing device 1002 and facilitating operation of the rotary actuator associated with the tilt axis 1022.

Figure 13:
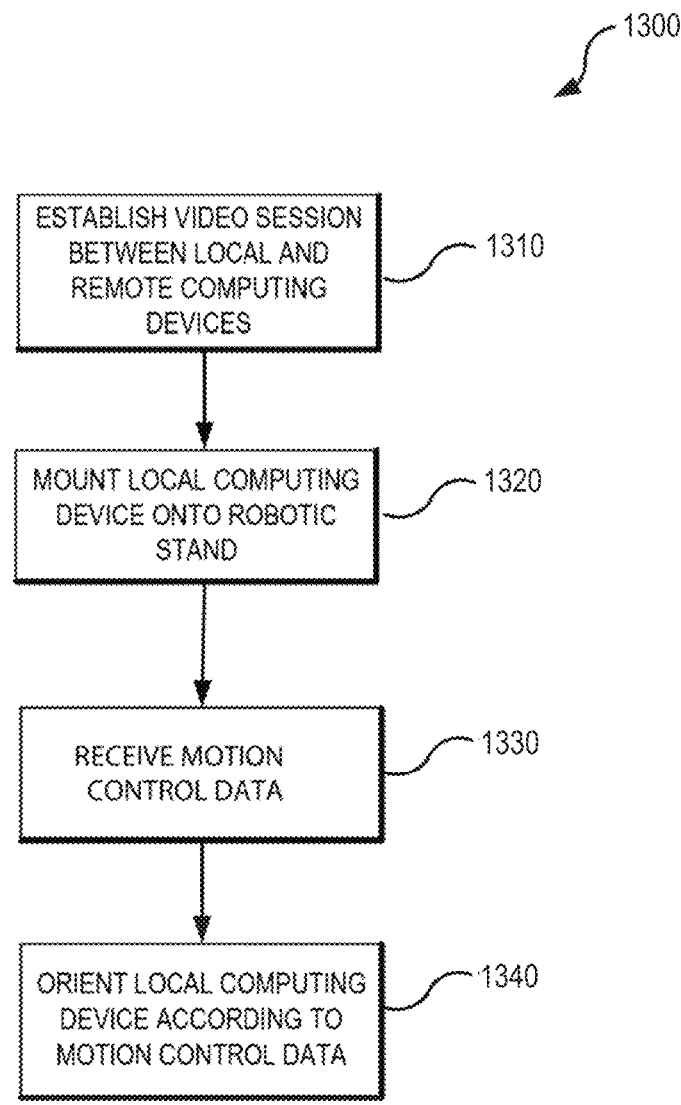
FIG. 13 is a flowchart illustrating a set of operations for orienting a local computing device supported on a robotic stand in accordance with an embodiment of the disclosure.

FIG. 13 is a flowchart illustrating a set of operations 1300 for orienting a local computing device supported on a robotic stand in accordance with an embodiment of the disclosure. At operation 1310, a video session is established between a local computing device 120 and a remote computing device 105. The video session may be established by a user of the remote computing device 105 or a user of the local computing device 120 initiating a video client module 220, 270 associated with the respective computing device 105, 120. The video session may establish a video feed between the computing devices 105, 120.

At operation 1320, the local computing device 120 is mounted onto a robotic stand 125, which operation may occur prior to, concurrently with, or subsequent to establishing the video session. To mount the local computing device 120 onto the robotic stand 125, a lower edge of the local computing device 120 may be positioned on a gripping member 1006 coupled to the stand 125. Additional gripping members 1008 may be positioned in abutment with opposing side edges of the local computing device 120, thereby securing the local computing device 120 to the stand 125. The additional gripping members 1008 may be coupled to pivotable arms 1012, which may be biased toward one another. In some implementations, a user of the local computing device 120 may pivot the arms 1012 away from one another by applying an outwardly-directed force to one of the arms 1012. Once the free ends of the arms 1012 are spread apart from one another a sufficient distance to permit the local computing device 120 to be placed between the gripping members 1008, the local computing device 120 may be positioned between the gripping members 1008 and the user may release the arm 1012 to permit the arms 1012 to drive the gripping members 1008 into engagement with opposing sides of the local computing device 120.

At operation 1330, the local computing device 120, the robotic stand 125, or both may receive motion control data. In some situations, the motion control data is received from the remote computing device 105. The motion control data may be transceived between the remote and local computing devices 105, 120 by way of the respective control modules 225, 275. In some situations, the motion control data is received from a sound module 955. The sound module 955 may receive sound waves with a microphone array 965 and transmit an electrical signal containing the sound data to a sound processor 970, which may determine a location of a source of the sound waves. The sound processor 970 may transmit the sound data to a processing unit 910, which may process the sound data into motion control data. Although referred to as separate components, the sound processor 970 and the processing unit 910 may be a single processing unit. The motion control data may include motion commands such as positioning instructions. The positioning instructions may include instructions to pan the local computing device 120 about a pan axis in a specified direction, to tilt the local computing device about a tilt axis in a specified direction, or both.

Additionally or alternatively, one of the respective control modules 225, 275 may receive motion control commands from the web browser modules 215, 265 via the processors 210, 260. The web browser modules 215, 265 may be operating in the workspace interface module as depicted in FIG. 4. A local administrative operator that possibly performed the operation 1320 (setting up the local computing device) may initially set-up the workspace view. As depicted in FIG. 3, the administrative operator may configure the workspace, the number and locations of positions, and the placement of the various local computing devices 120/robotic stands 125. Further, the administrative operator may also initially set up the pan and tilt locations for each partner located around the workspace. However, a remote user may set up the pan and tilt setting for each partner location along with any other fixture around the conference room, e.g., white boards, projection screens, etc.

After configuration of the workspace view, a local user may then send motion control commands through the conference room view interface to view and interact with the other conference attendees and to view any additional fixtures of interest. Additionally, the remote user may configure his settings of the conference room interface so that the local computer 120/robotic stand 125 combination automatically orients itself to face a speaking partner around the workspace. This automatic control may be operated via the sound module 655.

At operation 1340, the robotic stand 125 may orient the local computing device 120 according to the motion control data and/or the conference room interface settings. The processing unit 910 may actuate a rotary actuator 920 associated with at least one of a pan axis 1028 or a tilt axis 1022 by transmitting a signal containing a trigger characteristic (such as a certain current or voltage) to the rotary actuator 920. The processing unit 910 may continue to transmit the signal to the rotary actuator 920 until the robotic stand 125 moves the local computing device 120 into the instructed position. A separate rotary actuator 920 may be associated with each axis 1028, 1022. The processing unit 910 may monitor the current rotational position of the rotary actuator relative to the instructed rotational position to ensure the robotic stand 125 moves the local computing device 120 into the desired position.

Figure 14:
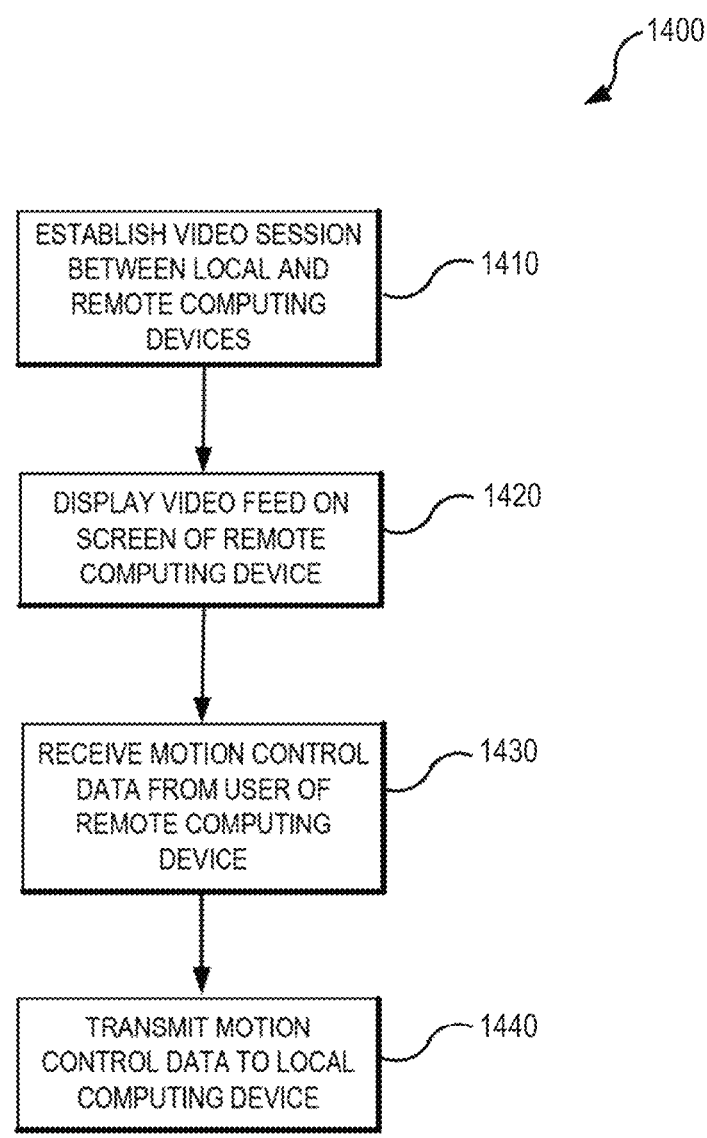
FIG. 14 is a flowchart illustrating a set of operations for remotely controlling an orientation of a local computing device supported on a robotic stand in accordance with an embodiment of the disclosure.

FIG. 14 is a flowchart illustrating a set of operations 1400 for remotely controlling an orientation of a local computing device 120 supported on a robotic stand 125 in accordance with an embodiment of the disclosure. At operation 1410, a video session is established between a remote computing device 105 and a local computing device 120. The video session may be established by a user of the remote computing device 105 or a user of the local computing device 120 initiating a video client module 220, 270 associated with the respective computing device 105, 120. The video session may establish a video feed between the computing devices 105, 120. In concert with operation 1210, the user establishing the video session, whether of the local or remote computing device, may load a workspace view. The workspace view 400 may be viewable and accessible by a remote user during the video session and may give the user pre-set locations for the local computer 120/robotic stand 125 combination.

At operation 1420, a video feed is displayed on a screen of the remote computing device 105. The video display may include the conference room view 500 as a separate control window to the video displayed on the remote computing device 105. The user of the remote computing device may also have the ability to configure or re-configure the saved pan and tilt locations associated with the other location around the conference room table and the view of any additional areas/fixtures through edit mode 610 of FIG. 6B.

At operation 1430, motion control data is received from a user of the remote computing device 105. The user of the remote computing device 105 may input a positioning instruction by way of the motion control input module 230. For example, an interactive workspace view interface may be displayed on a screen of the remote computing device 105, as noted above, and may allow a user to input positioning instructions by selecting the various saved positions shown on the conference room view interface. By interacting with the workspace view interface, the user may generate positioning instructions for transmission to the local computing device 120, the robotic stand 125, or both.

At operation 1440, the remote computing device 105 may transmit motion control data including positioning instructions to the local computing device 120, the robotic stand 125, or both. The motion control data may be transmitted from the remote computing device 105 to the local computing device 120 via the respective control module 225, 275 real-time during a video session between the computing devices 105, 120. The motion control data may include motion commands such as positioning instructions. The positioning instructions may include instructions to pan the local computing device 120 about a pan axis in a specified direction, to tilt the local computing device about a tilt axis in a specified direction, or both.

As discussed, a robotic stand 125 may include pan and tilt functionality. A portion of the stand 125 may be rotatable about a pan axis, and a portion of the stand 125 may be rotatable about a tilt axis. In some implementations, a user of a remote computing device 105 may remotely orient a local computing device 120, which may be mounted onto the robotic stand 125, by issuing motion commands via a communication network, such as the Internet, to the local computing device 120. The motion commands may cause the stand 125 to move about one or more axes, thereby allowing the remote user to remotely control the orientation of the local computing device 120. In some implementations, the motion commands may be initiated autonomously from within the local computing device 120.

The foregoing description has broad application. While the provided examples are discussed in relation to a videoconference between computing devices, it should be appreciated that the robotic stand may be used as a pan and tilt platform for other devices such as cameras, mobile phones, and digital picture frames. Further, the robotic stand may operate via remote web control following commands manually input by a remote user or may be controlled locally by autonomous features of the software running on a local computing device. Accordingly, the discussion of any embodiment is meant only to be explanatory and is not intended to suggest that the scope of the disclosure, including the claims, is limited to these examples. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The term "module" as used herein refers to any known or later developed hardware, software, firmware, artificial intelligence, fuzzy logic, or combination of hardware and software that is capable of performing the functionality associated with that element.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. In methodologies directly or indirectly set forth herein, various steps and operations are described in one possible order of operation, but those skilled in the art will recognize that steps and operations may be rearranged, replaced, or eliminated or have other steps inserted without necessarily departing from the spirit and scope of the present disclosure. Moreover, the following claims are hereby incor-

The invention claimed is:

1. A method for operating a robotic stand supporting a computing device, the method comprising:
   establishing a connection between the computing device, including at least a display and a camera, and a remote device;
   displaying, by a display of the remote device, a control interface depicting a conference room that includes a schematic of a conference room table and a plurality of attendee positions;
   providing, responsive to a user of the remote device interacting with the control interface, a positioning instruction to orient the robotic stand about at least a pan axis or a tilt axis so that a display and a camera of the computing device faces at least one attendee position, wherein the robotic stand supporting the computing device is physically located in the conference room depicted by the control interface;
   transmitting, by the remote device, over a communication network, a signal indicative of the positioning instruction to the computing device; and
   transmitting the positioning instruction from the computing device to the robotic stand.

2. The method of claim 1, further comprising:
   receiving a first video feed from the camera of the computing device displaying the attendee position selected in accordance with the positioning instructions; and
   transmitting a second video feed from a camera of the remote device to be shown on the display of the computing device.

3. The method of claim 1, further comprising:
   receiving, responsive to the user of the remote device interacting with the control interface, a configuration instruction to change a shape of the conference room table depicted by the control interface; and
   altering the shape of the conference room table depicted by the control interface responsive to the configuration instruction.

4. The method of claim 1, further comprising:
   receiving, from a server coupled to the computing device and the remote device, the control interface.

5. The method of claim 1, further comprising:
   displaying a plurality of preset locations on the control interface depicting the conference room, wherein the plurality of preset locations correspond with attendee locations around a perimeter of the conference room table depicted by the control interface.

6. The method of claim 1, further comprising:
   receiving, from the user of the remote device interacting with the control interface, a preset instruction to scan the conference room for presetting locations of the attendees; and
   setting the preset locations on the control interface as the robotic stand scans the conference room depicted by the control interface.

7. The method of claim 1, further comprising:
   providing, responsive to an action of the user of the remote device interacting with the control interface, a configuration instruction to manipulate a video projector located in a physical conference room depicted by the control interface; and
   transmitting the configuration instruction to the computing device located in the physical conference room.

8. A method of automatically tracking an object during a videoconference with a computing device supported on a robotic stand, the method comprising:
   receiving, with the computing device, a command to track the object from a remote device responsive to a user input;
   receiving an image from a camera, wherein the camera provides pixel information of the image;
   transmitting an electrical signal containing the pixel information of the image to at least one processing unit of the computing device;
   responsive to receiving the command to track the object, determining, by the at least one processing unit, a location of a source of the pixel information of the image;
   transmitting, via the computing device, a positioning instruction to the robotic stand to orient the robotic stand about at least a pan axis or a tilt axis to aim the computing device at the location of the source of the pixel information of the image; and
   rotating the robotic stand based on the positioning instruction without further user interaction.

9. The method of claim 8, wherein rotating the robotic stand about at least one of a pan axis or a tilt axis comprises actuating a rotary actuator associated with the at least one of a pan axis or a tilt axis.

10. The method of claim 9, further comprising generating, by the at least one processing unit, a motion command signal and transmitting the motion command signal to the rotary actuator to actuate the rotary actuator.

11. A method for operation of a robotic stand supporting a computing device, the method comprising:
    displaying, by a display of a remote device, a control interface depicting a physical location that includes a plurality of robotic stands with respective computing devices;
    providing, responsive to a user of the remote device interacting with the control interface, a selection instruction selecting a region of the physical location for viewing with one of the plurality of robotic stands with respective computing devices, wherein each of the plurality of computing devices at least includes a display and a camera; and
    connecting, by the control interface, to at least one of the plurality of robotic stands including a respective computing device, wherein the at least one of the plurality of robotic stands including a respective computing device is selected based at least on proximity to the region of the physical location.

12. The method of claim 11, wherein connecting, by the control interface, to at least one of the plurality of robotic stands including a respective computing device, wherein the at least one of the plurality of robotic stands including a respective computing device is selected based at least on proximity to the region of the physical location comprises:
    determining, by the control interface, which of the plurality of robotic stands including a respective computing device in close proximity to the region of the physical location is available; and
    transmitting, by the remote device, a connection request over a communications network to the robotic stand including the computing device determined to be available; and
    receiving, at the remote device, a video feed from the robotic stand including the computing device determined to be available, the video feed showing the region of the physical location.

13. The method of claim 12, further comprising:
generating, by the control interface, a positioning instruction based on the selected region of the physical location, the positioning instruction configured to orient the robotic stand including the computing device determined to be available to face the region of the physical location; and
transmitting, by the remote device over the communications network, a signal indicative of the positioning instruction to the robotic stand including the computing device determined to be available.

14. The method of claim 11, further comprising:
providing, responsive to a user interacting with the control interface, a selection command selecting one of the plurality of robotic stands including a respective computing device; and
transmitting, by the control interface, the selection command by a communications network to the selected one of the plurality of robotic stands including a respective computing device.

15. The method of claim 12, further comprising:
providing, responsive to the user of the remote device interacting with the control interface, a positioning instruction to orient the selected one of the plurality of robotic stands including a respective computing device about at least a pan axis or a tilt axis so that a display and a camera of the computing device faces a desired region of the physical location; and
transmitting, by the remote device, over a communication network a signal indicative of the positioning instruction to the robotic stand.

16. A method for operation of a robotic stand supporting a computing device, the method comprising:
displaying, on a display of a remote device, a control interface showing a plurality of views available from the robotic stand supporting the computing device;
providing, responsive to a user of the remote device interacting with the control interface, a selection command selecting one of the plurality of views;
transmitting, by the remote device over a communications network, a signal indicative of the selection command to the computing device; and
providing, via the computing device, a positioning instruction to the robotic stand supporting the computing device to orient the robotic stand about at least a pan axis or a tilt axis to provide a view corresponding to the selection command.

17. The method of claim 16, further comprising:
receiving, at the remote device, a video feed from a camera of the computing device showing the selected one of the plurality of views.

18. The method of claim 17, further comprising:
providing, responsive to the user of the remote device interacting with the control interface, a scan command to scan a viewable area of the selected one of the plurality of views for individuals located therein by the robotic stand including the computing device;
transmitting, by the remote device over a communications network, a signal comprising the scan command to the robotic stand including the computing device; and
receiving, by the control interface, a video feed from the robotic stand including the computing device as the scan command is performed, the video feed showing an individual.

19. The method of claim 18, further comprising:
performing, by the remote device, a facial recognition operation to determine the identity of the individual shown in the video feed; and
displaying, by the control interface on the display of the remote device, social media contents attributed to the individual based on the determination of the individual's identity.

20. The method of claim 16, further comprising:
displaying, by the remote device, a selection of a plurality of other robotic stands including a computing device located at various locations around a physical area; and
displaying, by the remote device, a status of each of the plurality of other robotic stands including a computing device located at various locations around a physical area.

21. The method of claim 20, further comprising:
providing, responsive to the user interacting with the control interface, a selection command to select one of the plurality of other robotic stands including a computing device located at various locations around a physical area;
prompting the user via the control interface with a password input panel for the user to connect with the selected one of the plurality of other robotic stands including a computing device;
receiving, from the user interacting with the control interface, a password to connect with the selected one of the plurality of other robotic stands including a computing device; and
connecting, using the control interface, the remote device to the selected one of the plurality of other robotic stands including a computing device.

* * * * *